US009606757B2

(12) United States Patent
Yamada et al.

(10) Patent No.: US 9,606,757 B2
(45) Date of Patent: Mar. 28, 2017

(54) MANAGEMENT SYSTEM, IMAGE PROCESSING APPARATUS, NON-TRANSITORY COMPUTER-READABLE RECORDING MEDIUM ENCODED WITH PROTOCOL SHARING PROGRAM, AND PROTOCOL SHARING METHOD

(71) Applicant: Konica Minolta, Inc., Chiyoda-ku, Tokyo (JP)

(72) Inventors: Masami Yamada, Osaka (JP); Kazumi Sawayanagi, Itami (JP); Hisashi Uchida, Kyoto (JP); Kazuya Anezaki, Itami (JP); Akihiro Torigoshi, Itami (JP); Yasutaka Ito, Amagasaki (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 14/807,564

(22) Filed: Jul. 23, 2015

(65) Prior Publication Data
US 2016/0026413 A1 Jan. 28, 2016

(30) Foreign Application Priority Data
Jul. 28, 2014 (JP) .................. 2014-152835

(51) Int. Cl.
*G06F 3/12* (2006.01)
*H04N 1/32* (2006.01)
*H04N 1/00* (2006.01)

(52) U.S. Cl.
CPC .......... *G06F 3/1221* (2013.01); *G06F 3/1229* (2013.01); *G06F 3/1232* (2013.01);
(Continued)

(58) Field of Classification Search
CPC .... G06F 3/1221; G06F 3/1224; G06F 3/1229; G06F 3/1232; G06F 3/1286;
(Continued)

(56) References Cited

U.S. PATENT DOCUMENTS

2011/0122437 A1* 5/2011 Shimohira ............ G06F 3/1204
358/1.15
2013/0124692 A1* 5/2013 Yang .................. H04L 12/2812
709/219

FOREIGN PATENT DOCUMENTS

JP 2010-176424 A 8/2010
JP 2010176424 A * 8/2010

* cited by examiner

*Primary Examiner* — Chad Dickerson
(74) *Attorney, Agent, or Firm* — Buchanan Ingersoll & Rooney PC

(57) ABSTRACT

A controller of a management device managing a plurality of image processing apparatuses acquires ability information and device identification information from the respective image processing apparatuses; determines, based on the ability information of the respective image processing apparatuses, as an in-charge device any one of the respective image processing apparatuses for each of a plurality of protocols predetermined; for the respective protocols, causes the in-charge device determined for the protocol to respond to a packet by multicast of the protocol on behalf of the respective image processing apparatuses; and causes one or more image processing apparatuses other than the in-charge device determined for the protocol to refrain from responding to a packet by multicast of the protocol. The respective image processing apparatuses respond to a packet by multicast of the protocol if the apparatus itself is determined the in-charge device for the protocol.

19 Claims, 18 Drawing Sheets

(52) U.S. Cl.
CPC ....... *G06F 3/1286* (2013.01); *H04N 1/00896* (2013.01); *H04N 1/32411* (2013.01); *H04N 2201/0094* (2013.01); *Y02B 60/1271* (2013.01)

(58) Field of Classification Search
CPC .. G06F 9/5027; G06F 9/5072; G06F 11/0709; H04N 1/00896; H04N 1/32411; H04N 2201/0094; Y02B 60/1271
USPC ....... 358/1.11–1.18, 504, 406; 709/201–207, 709/220–222, 223, 225–227, 229; 718/1, 718/100–108; 713/320, 323, 340; 710/8–19, 36–40, 44, 244
See application file for complete search history.

F I G. 3
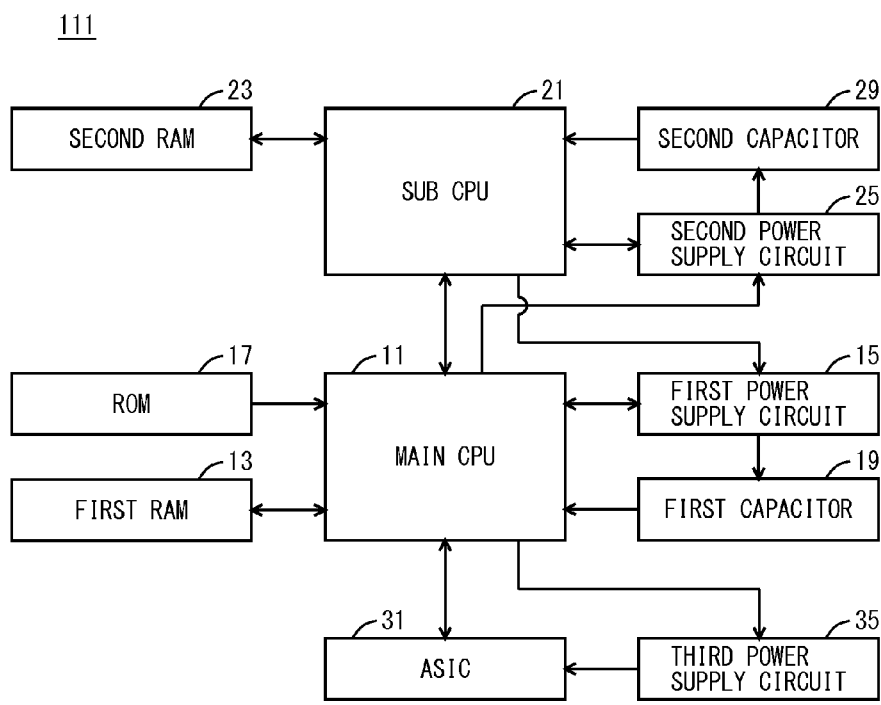

F I G. 5
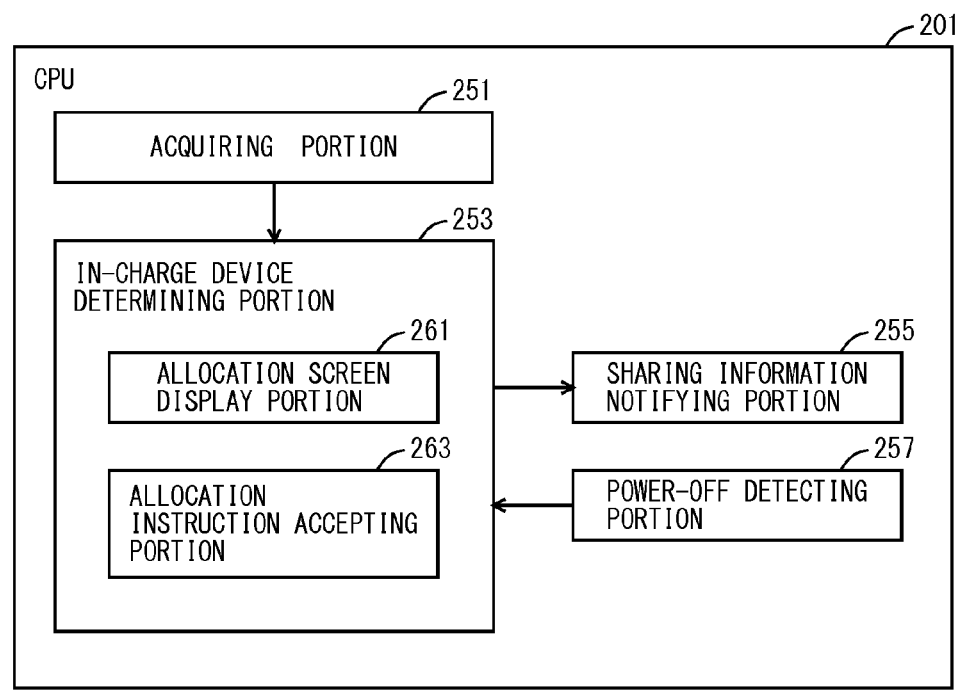

F I G. 1 7
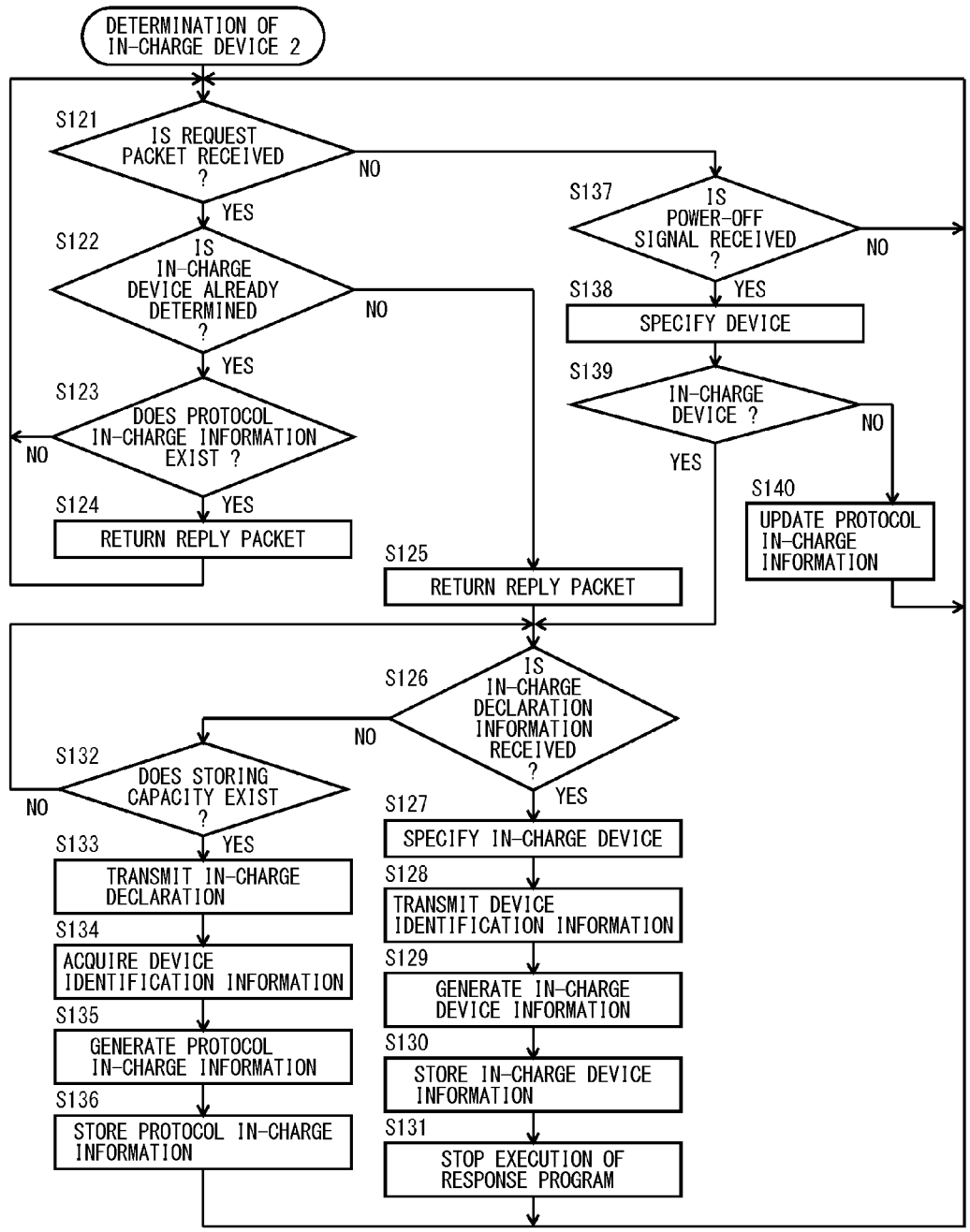

MANAGEMENT SYSTEM, IMAGE PROCESSING APPARATUS, NON-TRANSITORY COMPUTER-READABLE RECORDING MEDIUM ENCODED WITH PROTOCOL SHARING PROGRAM, AND PROTOCOL SHARING METHOD

This application is based on Japanese Patent Application No. 2014-152835 filed with Japan Patent Office on Jul. 28, 2014, the entire content of which is hereby incorporated by reference.

BACKGROUND OF THE INVENTION

Field of the Invention

The present invention relates to a management system, an image processing apparatus, a non-transitory computer-readable recording medium encoded with a protocol sharing program, and a protocol sharing method. More particularly, the present invention relates to a management system which manages an image processing apparatus capable of shifting to a power saving state in which less power is consumed, an image processing apparatus included in the management system, a non-transitory computer-readable recording medium encoded with a protocol sharing program executed in the image processing apparatus, and a protocol sharing method executed in the image processing apparatus.

Description of the Related Art

A plurality of multi-function peripherals (hereinafter, referred to as "MFPs") may be provided in office and the like, which are generally connected to a local area network (LAN). In such a network environment, a service which enables detection of a device connected to the network is commonly used. This service allows a computer connected to the network to transmit a search command to the network and search for a device which can be used. Thus, this makes it possible for the computer to readily use a plurality of MFPs connected to the network. As an example of such service, Simple Service Discovery Protocol (SSDP), Web Services on Devices (WSD), Service Location Protocol (SLP), and multicast Domain Name System (mDNS) are known.

Meanwhile, in recent years, an MFP has been required to reduce power consumption in a standby state when not being in operation. However, in order to handle above service, the MFP is needed to keep the power on for responding to a search command transmitted from the computer.

Japanese Patent Laid-Open No. 2010-176424 discloses an image forming system including a network for performing communication of signal, and a plurality of image forming apparatuses connected to the network and capable of forming an image on the basis of an image forming command received via the network, wherein an image forming apparatus among the plurality of image forming apparatuses sets as a proxy device another image forming apparatus among the plurality of image forming apparatuses, causes another image forming apparatus to perform on behalf of the apparatus itself, provision of a service other than the image forming command included in a signal transmitted to the apparatus itself via the network, and then the apparatus itself shifts to a power saving state in which power consumption is smaller than in an operation state.

However, there have been problems that, in a conventional image forming system, an image forming apparatus performing as a proxy device can not shift to a power saving state, and is needed to continuously conduct electricity.

SUMMARY OF THE INVENTION

According to an aspect of the present invention, a management system includes a plurality of image processing apparatuses connected to a network, and a management device to manage the plurality of image processing apparatuses. A controller included in the management device includes: an acquiring portion configured to acquire, from each of the plurality of image processing apparatuses, ability information indicating an ability of the image processing apparatus and device identification information for identifying the image processing apparatus; an in-charge device determining portion configured to determine, on the basis of the ability information of each of the plurality of image processing apparatuses, as an in-charge device any one of the plurality of image processing apparatuses for each of a plurality of protocols predetermined; and a sharing information notifying portion configured to, for each of the plurality of protocols, cause the in-charge device determined for the protocol to respond to a packet by multicast of the protocol on behalf of the plurality of image processing apparatuses, and cause one or more image processing apparatuses other than the in-charge device determined for the protocol to refrain from responding to a packet by multicast of the protocol. Each of the plurality of image processing apparatuses responds to a packet by multicast of the protocol in the case where the apparatus itself is determined as the in-charge device for the protocol.

According to another aspect of the present invention, an image processing apparatus capable of communicate with another one or more image processing apparatuses connected to a network, includes a control portion. The control portion includes: an acquiring portion configured to, from each of the another one or more image processing apparatuses, acquire ability information indicating an ability of the image processing apparatus and device identification information for identifying the image processing apparatus; an in-charge device determining portion configured to determine, on the basis of the ability information of each of a plurality of image processing apparatuses including the apparatus itself and the another one or more image processing apparatuses, as an in-charge device any one of the one or more image processing apparatuses for each of a plurality of protocols predetermined; and a sharing information notifying portion configured to, for each of the plurality of protocols, cause the in-charge device determined for the protocol to respond to a packet by multicast of the protocol on behalf of the plurality of image processing apparatuses, and cause one or more image processing apparatuses other than the in-charge device determined for the protocol to refrain from responding to a packet by multicast of the protocol.

According to a further aspect of the present invention, an image processing apparatus capable of communicate with another one or more image processing apparatuses connected to a network, includes a control portion. The control portion includes: a packet detecting portion configured to detect a packet, among packets externally received, of any one of a plurality of protocols predetermined; a proxy declaration portion configured to, in the case where a packet of any one of the plurality of protocols is detected by the packet detecting portion, on the condition that a proxy declaration including protocol identification information for identifying a protocol of the detected packet is not received from any one of the another one or more image processing apparatuses, transmit to all of the another one or more image processing apparatuses the proxy declaration including protocol identification for identifying a protocol of the detected packet; a device acquiring portion configured to acquire device identification information for identifying the image processing apparatus from each of the another one or more image processing apparatuses; and a reply control portion configured to, in the case where the proxy declaration is transmitted to the another one or more image processing apparatuses, respond to a packet by multicast of a protocol specified by protocol identification information included in the proxy declaration, on behalf of a plurality of image processing apparatuses including the apparatus itself and the another one or more image processing apparatuses, whereas in the case where the proxy declaration is received from the another one or more image processing apparatuses, refrain from responding to a packet by multicast of a protocol specified by protocol identification information included in the proxy declaration.

According to a further aspect of the present invention, a non-transitory computer-readable recording medium is encoded with a protocol sharing program executed by a controller controlling an image processing apparatus capable of communicating with another one or more image processing apparatuses connected to a network. The protocol sharing program causes the controller to execute: an acquiring step of acquiring, from each of the another one or more image processing apparatuses, ability information indicating an ability of the image processing apparatus and device identification information for identifying the image processing apparatus; an in-charge device determining step of determining, on the basis of the ability information of each of the another one or more image processing apparatuses, as an in-charge device any one of the one or more image processing apparatuses for each of a plurality of protocols predetermined; and an sharing information notifying step of, for each of the plurality of protocols, causing the in-charge device determined for the protocol to respond to a packet by multicast of the protocol on behalf of the plurality of image processing apparatuses, and causing one or more image processing apparatuses other than the in-charge device determined for the protocol to refrain from responding to a packet by multicast of the protocol.

According to a further aspect of the present invention, a non-transitory computer-readable recording medium is encoded with a protocol sharing program executed by a controller controlling an image processing apparatus capable of communicating with another one or more image processing apparatuses connected to a network. The protocol sharing program causes the controller to execute: a packet detecting step of detecting a packet, among packets externally received, of any one of a plurality of protocols predetermined; a proxy declaration step of, in the case where a packet of any one of the plurality of protocols is detected in the packet detecting step, on the condition that a proxy declaration including protocol identification information for identifying a protocol of the detected packet is not received from any one of the another one or more image processing apparatuses, transmitting to all of the another one or more image processing apparatuses the proxy declaration including protocol identification information for identifying a protocol of the detected packet; a device acquiring step of acquiring device identification information for identifying the image processing apparatus from each of the another one or more image processing apparatuses; and a reply control step of, in the case where the proxy declaration is transmitted to the another one or more image processing apparatuses, responding to a packet by multicast of a protocol specified by protocol identification information included in the proxy declaration, on behalf of a plurality of image processing apparatuses including the apparatus itself and the another one or more image processing apparatuses, whereas in the case where the proxy declaration is received from the another one or more image processing apparatuses, refraining from responding to a packet by multicast of a protocol specified by protocol identification information included in the proxy declaration.

According to a further aspect of the present invention, a non-transitory computer-readable recording medium is encoded with a protocol sharing program executed by a computer controlling a management device managing a plurality of image processing apparatuses connected to a network. The protocol sharing program causes the computer to execute: an acquiring step of acquiring, from each of the plurality of image processing apparatuses, ability information indicating an ability of the image processing apparatus and device identification information for identifying the image processing apparatus; an in-charge device determining step of determining, on the basis of the ability information of each of the plurality of image processing apparatuses, as an in-charge device any one of the plurality of image processing apparatuses for each of a plurality of protocols predetermined; and a sharing information notifying step of controlling the plurality of image processing apparatuses to, for each of the plurality of protocols, cause the in-charge device determined for the protocol to respond to a packet by multicast of the protocol on behalf of the plurality of image processing apparatuses, and cause one or more image processing apparatuses other than the in-charge device determined for the protocol to refrain from responding to a packet by multicast of the protocol.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 3 shows an example of a detailed configuration of a main circuit;

FIG. 5 is a block diagram showing an example of the functions of a CPU 201 included in a management PC according to the first embodiment;

FIG. 17 is a flowchart illustrating an exemplary flow of an in-charge device determining process according to the third embodiment.

DESCRIPTION OF THE PREFERRED EMBODIMENTS

Figure 1:
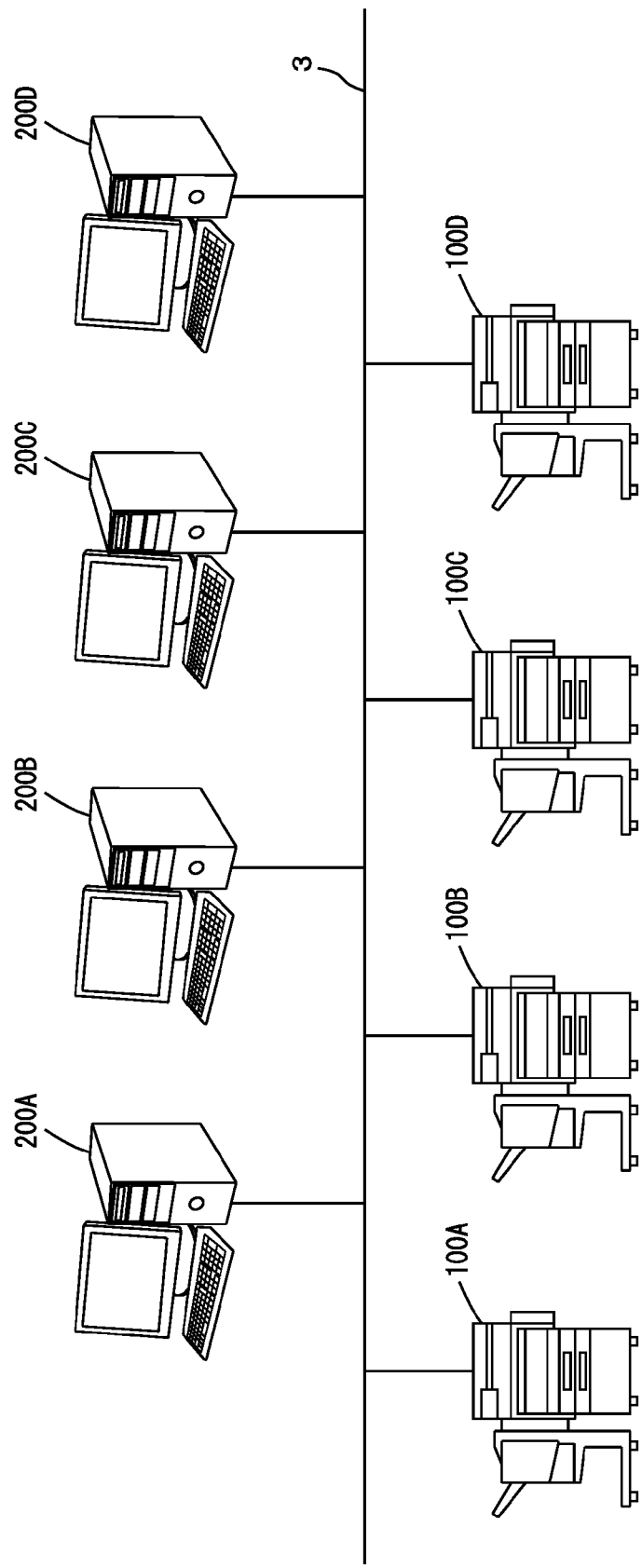
FIG. 1 schematically shows an example of a management system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

First Embodiment

FIG. 1 schematically shows an example of a management system according to an embodiment of the present invention. Referring to FIG. 1, a management system 1 includes multi function peripherals (MFPs) 100A, 100B, 100C and 100D, and personal computers (PCs) 200A, 200B, 200C and 200D. MFPs 100A, 100B, 100C and 100D, and PCs 200A, 200B, 200C and 200D are each connected to a local area network (LAN) 3.

Hereinafter, MFPs 100A, 100B, 100C and 100D are collectively referred to as MFP 100, while PCs 200A, 200B, 200C and 200D are collectively referred to as PC 200.

In management system 1 according to the present embodiment, PCs 200A to 200D are typical computers. Programs installed in each of PCs 200A to 200D may be different from each other. For example, there are protocols for searching for a device connected to LAN 3 such as SSDP, WSD, SLP and mDNS, any one of which may be used. Hereinafter, protocols such as SSDP, WSD, SLP and mDNS are collectively referred to as device searching protocols. The device searching protocols as used herein do not inquire about a physical address, i.e., a media access control (MAC) address, and do not include a protocol which inquires about a MAC address. SSDP, WSD, SLP and mDNS are described here by way of example, and the device searching protocol is not limited thereto, but may be a protocol which does not include a protocol that inquires about a MAC address.

In the device searching protocols mentioned above, basically, a request for finding a device connected to the network is transmitted by multicast. Then, the device connected to the network, in response to detection of the request, transmits by unicast a reply indicating an existence of the device itself. The reply includes device identification information for identifying the device itself. The device identification information includes a domain name and an Internet protocol (IP) address, but does not include a physical address, i.e., a MAC address. In the present embodiment, it is assumed, by way of example, that PC 200A uses SSDP protocol, PC 200B uses WSD protocol, PC 200C uses SLP protocol, and PC 200D uses mDNS protocol.

A response program corresponding to the device searching protocol which is used for each of PCs 200A to 200D to detect a device connected to LAN 3 is installed in each of MFPs 100A to 100D. Specifically, in each of MFPs 100A to 100D, a response program corresponding to SSDP protocol used by PC 200A, a response program corresponding to WSD protocol used by PC 200B, a response program corresponding to SLP protocol used by PC 200C, and a response program corresponding to mDNS protocol used by PC 200D are installed.

MFPs 100A to 100D basically have the same hardware configuration. Hereinafter, MFP 100A is described as an example of the hardware configuration of MFPs 100A to 100D, and the parts and functions included in MFPs 100B to 100D are denoted by the same reference characters denoting the same or corresponding parts and functions included in MFP 100A. Further, in the first embodiment, PC 200A has a function of managing MFPs 100A to 100D, and PC 200A may be referred to as management PC 200A.

Figure 2:
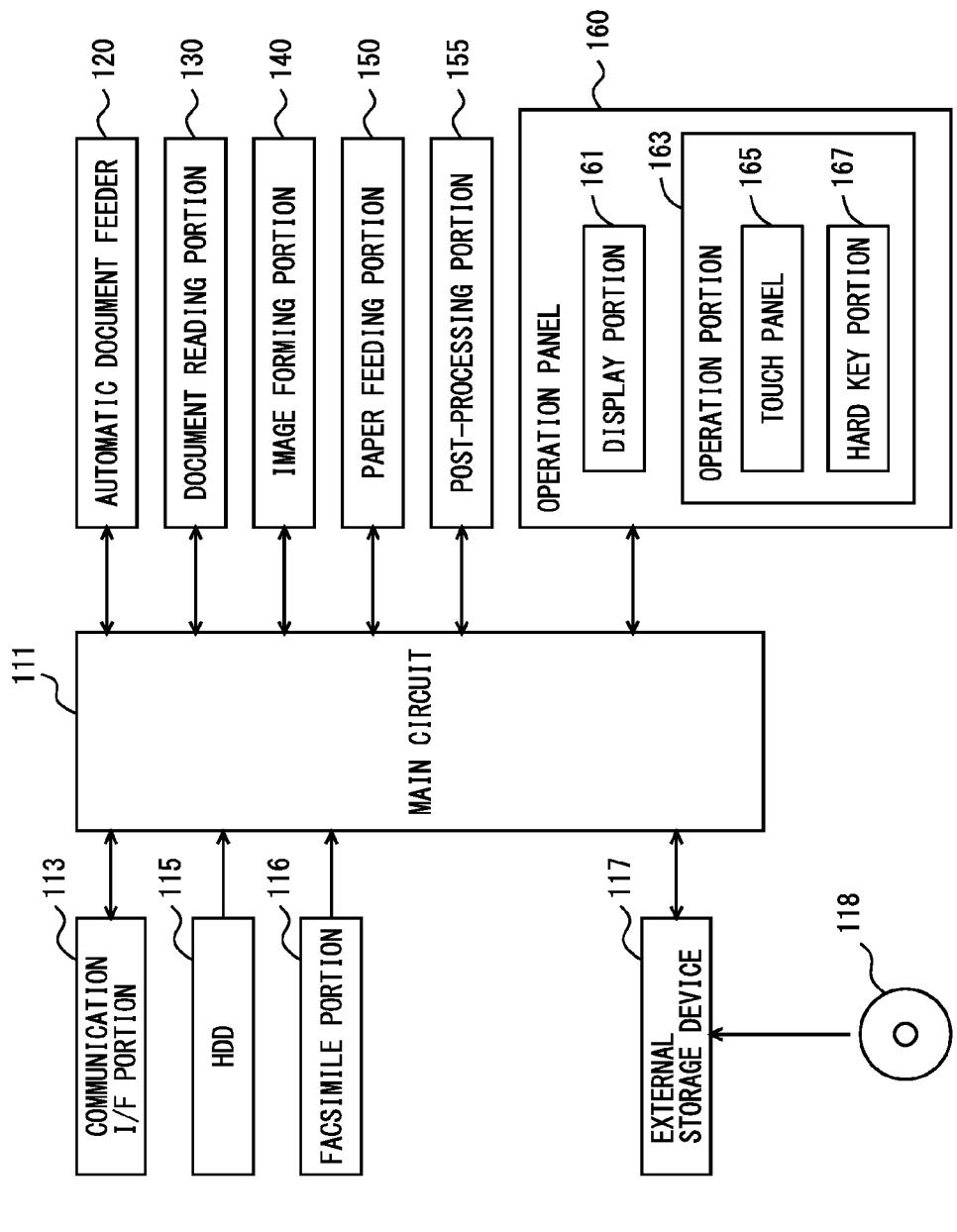
FIG. 2 is a block diagram schematically showing an example of hardware configuration of an MFP.

FIG. 2 is a block diagram schematically showing an example of hardware configuration of an MFP. Referring to FIG. 2, MFP 100A includes: a main circuit 111 responsible for overall control of MFP 100A; a document reading portion 130 for reading a document; an automatic document feeder 120 for feeding a document to document reading portion 130; an image forming portion 140 for forming an image on a sheet of paper or the like on the basis of image data output from document reading portion 130 that has read a document; a paper feeding portion 150 for supplying sheets of paper to image forming portion 140; a post-processing portion 155 which processes sheets of paper on which images have been formed; an operation panel 160 serving as a user interface; a communication interface (I/F) portion 113; a hard disk drive (HDD) 115 as a mass storage; a facsimile portion 116; and an external storage device 117 on which a CD-ROM 118 is mounted.

Post-processing portion 155 performs a sorting process of sorting and discharging one or more sheets of paper on which images have been formed by image forming portion 140, a hole-punching process of punching the sheets, and a stapling process of stapling the sheets.

Operation panel 160, which is provided on an upper surface of MFP 100A, includes a display portion 161 and an operation portion 163. Display portion 161 is a display such as a liquid crystal display (LCD) or an organic electro-luminescence display (ELD), and displays an instruction menu for the user, information about acquired image data, and others. Operation portion 163 includes a hard key portion 167 having a plurality of keys, and accepts input data, such as instructions, characters, and numerical characters, according to the key operations by the user. Operation portion 163 further includes a touch panel 165 disposed on display portion 161.

Communication I/F portion 113 is an interface for connecting MFP 100A to LAN 3. Communication I/F portion 113 communicates with a device connected to LAN 3 so as to transmit/receive data therebetween.

Facsimile portion 116 is connected to public switched telephone networks (PSTN), and transmits facsimile data to or receives facsimile data from the PSTN. Facsimile portion 116 stores the received facsimile data into HDD 115, or outputs the data to image forming portion 140. Image forming portion 140 prints on a sheet of paper the facsimile data received by facsimile portion 116. Further, facsimile portion 116 converts the data stored in HDD 115 to facsimile data, and transmits the facsimile data to a facsimile machine connected to the PSTN.

External storage device 117 is mounted with CD-ROM (compact Disk ROM) 118.

FIG. 3 shows an example of a detailed configuration of a main circuit. Referring to FIG. 3, a main circuit 111 includes: a main CPU 11; a first RAM 13; a first power supply circuit 15; a ROM 17; a first capacitor 19; a sub CPU 21; a second RAM 23; a second power supply circuit 25; a second capacitor 29; and a third power supply circuit 35.

Main CPU 11 is responsible for overall control of MFP 100A. ROM 17 is a semiconductor memory to store in a non-volatile manner a program and the like executed by main CPU 11. First RAM 13 is a non-volatile semiconductor memory to be controlled by main CPU 11 and used as a work area for main CPU 11 to execute a program. First power supply circuit 15 is controlled by main CPU 11 or sub CPU 21, so as to supply power to main CPU 11, first RAM 13 and first capacitor 19. Although power is not supplied from first power supply circuit 15, main CPU 11 and first RAM 13 are able to operate for a predetermined period of time by power which is reserved in first capacitor 19. Main CPU 11 controls sub CPU 21 and ASIC 31. Main CPU 11 further controls automatic document feeder 120, document reading portion 130, image forming portion 140, paper feeding portion 150, post-processing portion 155, operation panel 160, communication I/F portion 113, HDD 115, facsimile portion 116 and external storage device 117.

Main CPU 11 is able to access to CD-ROM 118 via external storage device 117. Main CPU 11 loads a program, which is stored in CD-ROM 118 mounted on external storage device 117, into first RAM 13 for execution. It is noted that the medium for storing the program executed by main CPU 11 is not restricted to CD-ROM 118, but may be an optical disc (a magneto-optical (MO) disc, a mini disc (MD), or a digital versatile disc (DVD)), an IC card, an optical card, or a semiconductor memory such as a mask ROM, an erasable programmable ROM (EPROM), an electrically erasable and programmable ROM (EEPROM), or the like.

Further, main CPU 11 may load a program stored in HDD 115 into first RAM 13 for execution. In this case, another computer connected to LAN 3 may rewrite the program stored in HDD 115 of MFP 100A, or may write a new program to be additionally stored. Further, MFP 100A may download a program from another computer connected to LAN 3, and store the program in HDD 115. As used herein, the "program" includes, not only the program which main CPU 11 can execute directly, but also a source program, a compressed program, an encrypted program, and others.

Sub CPU 21 operates during a period in which main CPU 11 is not in operation, and executes, on behalf of main CPU 11, part of a process executed by main CPU 11. Second RAM 23 is a non-volatile semiconductor memory to be controlled by sub CPU 21 and used as a work area for sub CPU 21 to execute a program. Second power supply circuit 25 is controlled by main CPU 11 or sub CPU 21, so as to supply power to sub CPU 21, second RAM 23 and second capacitor 29. Although power is not supplied from second power supply circuit 25, sub CPU 21 and second RAM 23 are able to operate for a predetermined period of time by power which is reserved in second capacitor 29.

ASIC 31 is controlled by main CPU 11, and is responsible for control of automatic document feeder 120, document reading portion 130, image forming portion 140, paper feeding portion 150 and post-processing portion 155. Third power supply circuit 35 is controlled by main CPU 11, and supplies power to ASIC 31.

Main circuit 111 switches an operation mode between a normal mode and a power-saving mode in which power consumption is smaller than in the normal mode. In the normal mode, main CPU 11 and ASIC 31 operate, whereas sub CPU 21 stops. Power consumption of main CPU 11 and ASIC 31 is smaller than power consumption of sub CPU 21. Further, in the case where main CPU 11 is not in operation, automatic document feeder 120, document reading portion 130, image forming portion 140, paper feeding portion 150, post-processing portion 155, operation panel 160, HDD 115 and external storage device 117 stop so as not to consume power, while communication I/F portion 113 and facsimile portion 116 operates in a state where power consumption is small.

In the power-saving mode, sub CPU 21 operates, whereas main CPU 11 and ASIC 31 stop. A process executed by sub CPU 21 is part of a process executed by main CPU 11, and for example, a process of controlling communication I/F portion 113 and facsimile portion 116, and a process of detecting a sleep reset signal.

The sleep reset signal is a signal detected by sub CPU 21, and for example, a signal for detecting open/close of a contact switch. The contact switch includes a contact switch included in each of automatic document feeder 120, document reading portion 130, image forming portion 140, paper feeding portion 150 and post-processing portion 155, as well as includes a plurality of hard keys of hard key portion 167 included in operation portion 163. The contact switch included in automatic document feeder 120 includes, for example, a contact switch for detecting a document being set in automatic document feeder 120. The contact switch included in document reading portion 130 includes a contact switch for detecting open/close of a lid covering a reading section of reading portion 130. The contact switch included in image forming portion 140 includes a contact switch for detecting open/close of a door provided to MFP 100A in order to externally expose image forming portion 140. The contact switch included in paper feeding portion 150 includes a contact switch for detecting open/close of a tray storing sheets of paper, and a contact switch for detecting open/close of a door for externally exposing a feeding path of sheets of paper so as to enable removing the sheets of paper jammed in the feeding path. The contact switch included in post-processing portion 155 includes a contact switch for detecting open/close of a door for externally exposing the inside. It should be noted that the contact switch is not limited to switches mentioned above.

During a period in which main CPU 11 is in operation, main CPU 11 causes second power supply circuit 25 to stop supplying power so as to stop sub CPU 21. Upon establishment of a condition for shifting to the power-saving mode, main CPU 11 allows second power supply circuit 25 to supply power to sub CPU 21 and second RAM 23 so as to activate sub CPU 21, then causes third power supply circuit 35 to stop supplying power to ASIC 35, and causes first power supply circuit 15 to stop supplying power to main CPU 11 and first RAM 13. The condition for shifting to the power-saving mode is, for example, the case where any operation by the user is not input continuously for more than a predetermined period of time, or the case where any job is not received continuously for more than a predetermined period time.

When sub CPU 21 is activated by main CPU 11, sub CPU 21 loads a program determined by main CPU 11 into second RAM 23 for execution. Upon establishment of a predetermined condition, sub CPU 21 allows first power supply circuit 15 to supply power to main CPU 11 and first RAM 13 so as to activate main CPU 11, and then causes second power supply circuit 25 to sop supplying power to sub CPU 21 and second RAM 23. The program executed by sub CPU 21 is the program determined by main CPU 11, which includes a program of controlling facsimile portion 116, a program of controlling communication I/F portion 113, and a program of detecting a sleep reset signal. The predetermined condition for sub CPU 21 to activate main CPU 11 includes the case determined by the program executed by sub CPU 11, and the case where the sleep reset signal is detected. The condition determined by the program executed by sub CPU 21 includes, if sub CPU 21 executes the program of controlling facsimile portion 116, the case where facsimile data is received. The condition for sub CPU 21 to activate main CPU 11 includes the case where sub CPU 21 executes the program of controlling communication I/F portion 113, which will be described later.

Figure 4:
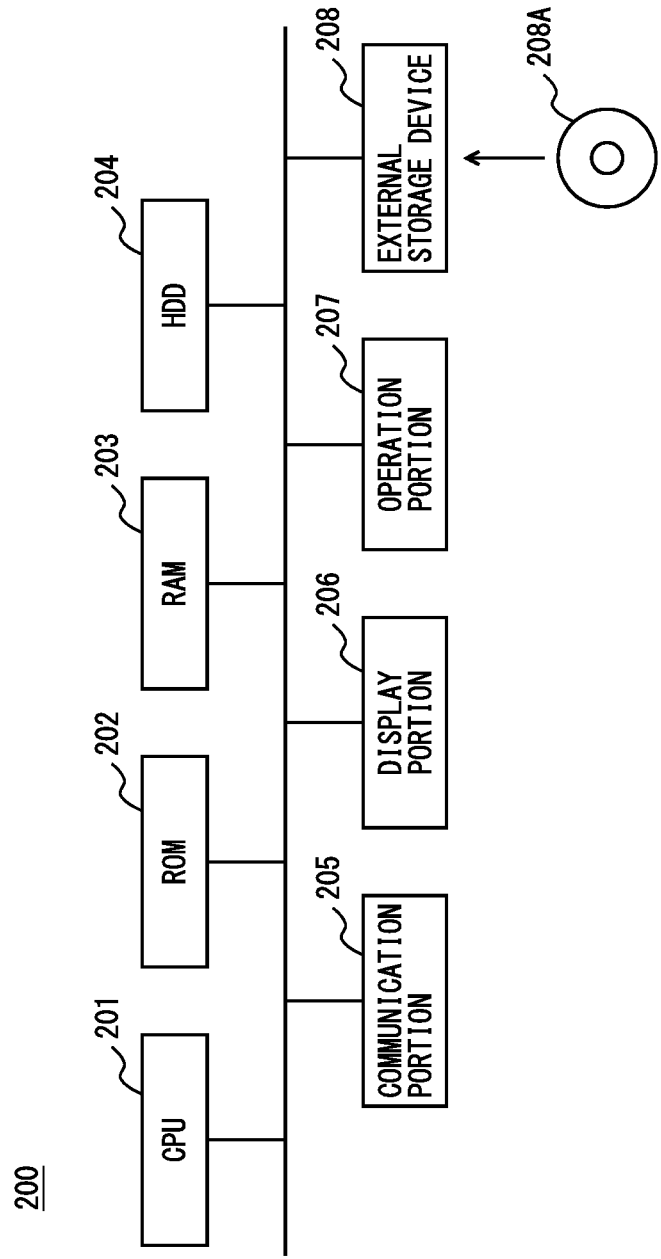
FIG. 4 is a block diagram schematically showing an example of hardware configuration of a PC according to an embodiment of the present embodiment.

FIG. 4 is a block diagram schematically showing an example of hardware configuration of a PC according to the present embodiment. Referring to FIG. 4, PC 200 includes: a CPU 201 responsible for overall control of PC 200; a ROM 202 for storing a program executed by CPU 201; a RAM 203 to be used as a work area for CPU 201; a HDD 204 for storing data in a non-volatile manner; a communication portion 205 for connecting CPU 201 to LAN 3; a display portion 206 for displaying information; an operation portion 207 for accepting operations by the user; and an external storage device 209.

External storage device 209 is mounted with CD-ROM 209A. CPU 201 is able to access CD-ROM 209A via external storage device 209. CPU 201 loads a program, which is stored in CD-ROM 209A mounted on external storage device 209, into RAM 203 for execution. It is noted that the medium for storing the program executed by CPU 201 is not restricted to CD-ROM 209A, but may be an optical disc, an IC card, an optical card, or a semiconductor memory such as a mask ROM, an EPROM, an EEPROM, or the like.

Further, the program executed by CPU 201 is not limited to the program stored in CD-ROM 209. CPU 201 may load a program, which is stored in HDD 204, into RAM 203 for execution. In this case, another computer connected to LAN 3 may rewrite the program stored in HDD 204 of PC 200, or may write a new program to be additionally stored. Further, PC 200 may download a program from another computer connected to LAN 3, and store the program in HDD 204. As used herein, the "program" includes, not only the program which main CPU 201 can execute directly, but also a source program, a compressed program, an encrypted program, and others.

FIG. 5 is a block diagram showing an example of the functions of CPU 201 included in a management PC according to the first embodiment. The functions shown in FIG. 5 are formed in CPU 201 included management PC as CPU 201 executes an in-charge device determination program. Referring to FIG. 5, CPU 201 includes: an acquiring portion 251; an in-charge device determining portion 253; a sharing information notifying portion 255; and a power-off detecting portion 257.

Acquiring portion 251 acquires device information from each of MFPs 100A to 100D connected to LAN 3. The device information includes ability information of a device and device identification information for identifying the device. The ability information indicates an amount of data which is able to be stored by the device in the power-saving mode. Hereinafter, the amount of data which is able to be stored by the device in the power-saving mode is referred to as remaining capacity. As sub CPU 21 operates in the power-saving mode, the remaining capacity of each of MFPs 100A to 100D is identical to free capacity of second RAM 23 which is controlled by sub CPU 21. Sub CPU 21 loads a program into second RAM 23 so as to execute the program. Therefore, the remaining capacity is identical to free capacity remaining after that sub CPU 21 has loaded the program into second RAM 23 for execution.

In-charge device determining portion 253, on the basis of the ability information of each of MFPs 100A to 100D, determines as an in-charge device any one of MFPs 100A to 100D for each of the four device searching protocols. The in-charge device is a device among MFPs 100A to 100D, to which any one of the four device searching protocols is allocated. In-charge device determining portion 253, on the basis of an operation by the user who is operating management PC 200, allocates each of the four device searching protocols to any one of MFPs 100A to 100D.

In-charge device determining portion 253 includes an allocation screen display portion 261 and an allocation instruction accepting portion 263. Allocation screen display portion 261 displays an allocation screen in display portion 206. The allocation screen includes the remaining capacity of each of MFPs 100A to 100D, and upon-execution capacity of each of four response programs corresponding to each of the device searching protocols, i.e., SSDP, WSD, SLP and mDNS. Here, the response program corresponding to SSDP protocol is referred to as a first program; the response program corresponding to WSD protocol is referred to as a second program; the response program corresponding to SLP protocol is referred to as a third program; and the response program corresponding to mDNS protocol is referred to as a fourth program. The upon-execution capacity is capacity occupied by the program which is loaded into second RAM 23 by sub CPU 21. Therefore, management PC 200A stores in advance the upon-execution capacity of each of the first to the fourth programs.

At the stage where the in-charge device is yet to be determined for each of the four device searching protocols, the allocation screen displayed in management PC 200A includes: device identification information for identifying each of MFPs 100A to 100D; the remaining capacity of each of MFPs 100A to 100D; protocol identification information for identifying each of the four device searching protocols; and the upon-execution capacity of each of the first to the fourth programs which corresponds to each of the four device searching protocols. The remaining capacity displayed in the allocation screen is capacity remaining in a state where any one of the first to the fourth programs is not loaded into second RAM 23.

Allocation instruction accepting portion 263 accepts an allocation instruction that the user inputs according to the allocation screen. The allocation instruction is an instruction to allocate each of the four device searching protocols to any one of MFPs 100A to 100D. The allocation instruction, for example, includes an instruction to select protocol identification information of any one of the four device searching protocols, and an instruction to select device identification information of any one of MFPs 100A to 100D.

In-charge device determining portion 253, upon acceptance of the allocation instruction, determines a device of the selected device identification information of any one of MFPs 100A to 100D as the in-charge device for a device searching protocol specified by the selected protocol identification information. In-charge device determining portion 253 recalculates remaining capacity of the device among MFPs 100A to 100D, which has been determined as the in-charge device, and in-charge device determining portion 253 allows allocation screen display portion 261 to redisplay the allocation screen including the remaining capacity recalculated. Specifically, management PC 200A updates the remaining capacity of the in-charge device displayed in the allocation screen by a value obtained by subtracting the upon-execution capacity of the response program corresponding to the device searching protocol allocated to the in-charge device from the remaining capacity of the in-charge device, and management PC 200A allows allocation screen display portion 261 to redisplay the allocation screen including the remaining capacity updated. This allows the user who is operating management PC 200A to, while seeing the remaining capacity of each of MFPs 100A to 100D, allocate the four device searching protocols to any one of MFPs 100A to 100D, in order for the remaining capacity to maintain a positive value.

Here, the device searching protocol includes the four protocols: SSDP, WSD, SLP and mDNS. In-charge device determining portion 253 determines: an in-charge device which is in charge of SSDP protocol; an in-charge device which is in charge of WSD protocol; an in-charge device which is in charge of SLP protocol; and an in-charge device which is in charge of mDNS protocol. Hereinafter, it is assumed, by way of example, that in-charge device determining portion 253 determines: MFP 100A as the in-charge device which is in charge of SSDP protocol; MFP 100B as the in-charge device which is in charge of WSD protocol; and MFP 100D as in-charge device which is in charge of SLP protocol and mDNS protocol. In this case, MFP 100C is not in charge of any one of SSDP, WSD, SLP and mDNS protocols. Further, it is assumed hereinafter that the in-charge device is determined for each of the four device searching protocols, and a device other than the in-charge device among MFPs 100A to 100D is referred to as a request device.

In-charge device determining portion 253 outputs to sharing information notifying portion 255 a pair of protocol identification information and device identification information of the in-charge device to which a device searching protocol of the protocol identification information allocates, for each of the four device searching protocols.

Sharing information notifying portion 255 notifies MFPs 100A to 100D of sharing information. The sharing information includes protocol in-charge information and protocol request information. The protocol in-charge information is information to be stored in the in-charge device, and includes protocol identification information and device identification information of a request device. The protocol request information is information to be stored in the request device, and includes protocol identification information. In SSDP protocol, sharing information notifying portion 255 transmits the protocol in-charge information to MFP 100A as the in-charge device via communication portion 205, and transmits the protocol request information to each of MFPs 100B to 100D via communication portion 205.

Power-off detecting portion 257 detects a device among MFPs 100A to 100D, which has turned the power off. As described later, each of MFPs 100A to 100D, when power has been turned off, transmits to management PC 200A a power-off signal indicating that power has been turned off. Upon reception of the power-off signal, power-off detecting portion 257 detects that the power of the device which has transmitted the power-off signal has been turned off, and then power-off detecting portion 257 outputs to in-charge device determining portion 253 a redetermination instruction including identification information of the device which has transmitted the power-off signal.

It is noted that power-off detecting portion 257 may make an inquiry at an arbitrary timing to MFPs 100A to 100D so as to detect whether power has been turned off or not. In this case, it is not necessary for MFPs 100A to 100D to transmit the power-off signal.

In response to the redetermination instruction being input from power-off detecting portion 257, in-charge device determining portion 253 determines, on the basis of the ability information of each of remaining devices among MFPs 100A to 100D other than a device specified by device identification information included in the redetermination instruction, any one of the remaining devices as the in-charge device for each of the four device searching protocols. In the same manner as described above, when the allocation screen is displayed and an allocation instruction by the user is accepted, in-charge device determining portion 253 determines any one of the three remaining devices as the in-charge device for each of the four device searching protocols. Then sharing information notifying portion 255 transmits the protocol in-charge information or the protocol request information respectively to the request device and the in-charge device redetermined for each of the four device searching protocols by in-charge device determining portion 253.

Figure 6:
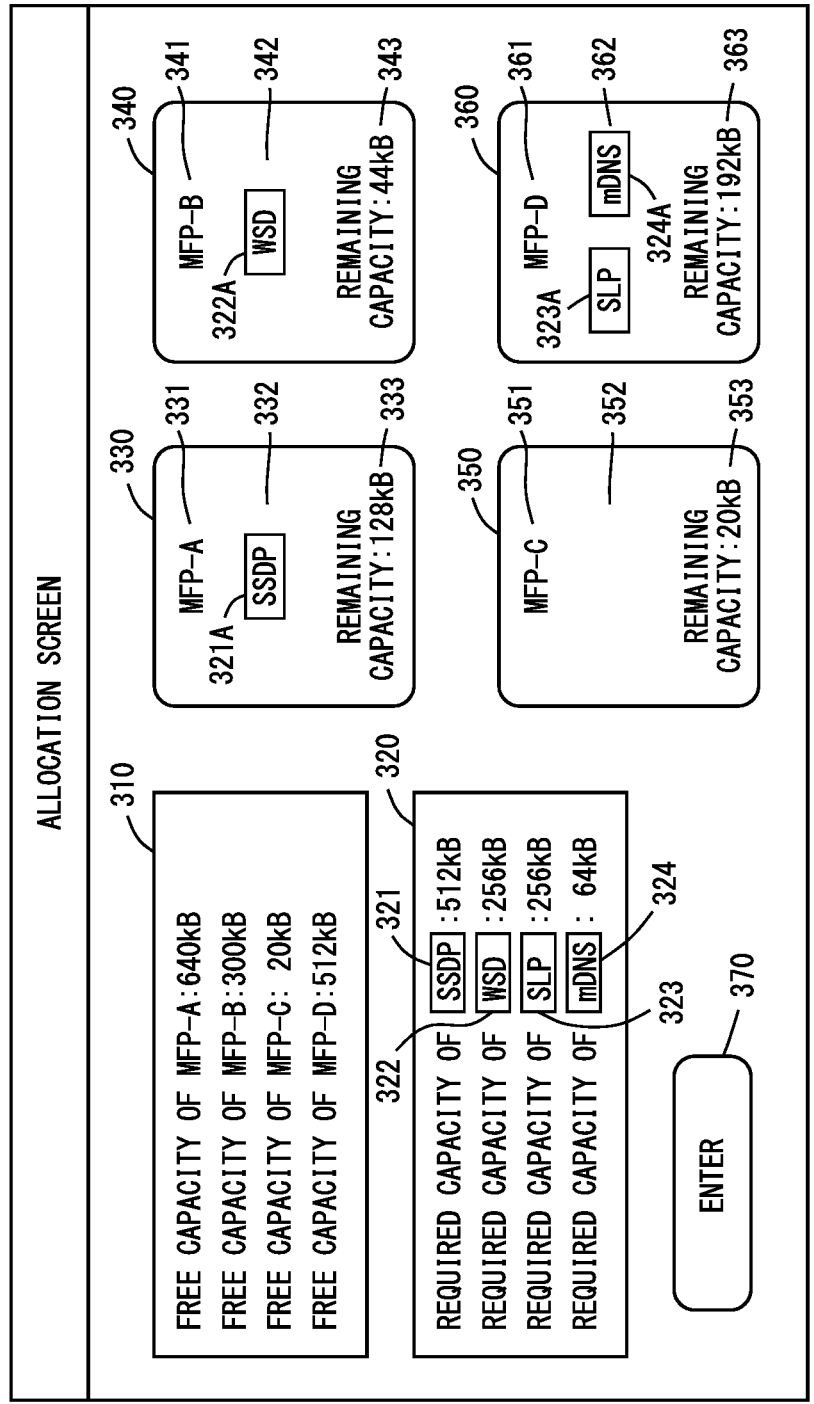
FIG. 6 shows an example of an allocation screen.

FIG. 6 shows an example of an allocation screen. Referring to FIG. 6, the allocation screen includes: a free capacity display area 310; an upon-execution capacity display area 320; and allocation state display areas 330, 340, 350 and 360. Free capacity display area 310 is an area for displaying free capacity of second RAM 23 of each of MFPs 100A to 100D. Here, it is displayed: the free capacity of second RAM 23 of MFP 100A is 640 kB; the free capacity of second RAM 23 of MFP 100B is 300 kB; the free capacity of second RAM 23 of MFP 100C is 20 kB; and the free capacity of second RAM 23 of MFP 100D is 512 kB.

Upon-execution capacity display area 320 is an area for displaying upon-execution capacity of a response program corresponding to each of the four device searching protocols. Here it is displayed: the upon-execution capacity of the response program corresponding to SSDP protocol is 512 kB; the upon-execution capacity of the response program corresponding to WSD protocol is 256 kB; the upon-execution capacity of the response program corresponding to SLP protocol is 256 kB; and the upon-execution capacity of the response program corresponding to mDNS protocol is 64 kB. Further, upon-execution capacity display area 320 includes: an icon 321 to enable selection of SSDP protocol; an icon 322 to enable selection of WSD protocol; an icon 323 to enable selection of SLP protocol; and an icon 324 to enable selection of mDNS protocol.

Allocation state display area 330 displays an allocation state of MFP 100A, and includes: an area 331 to display "MFP-A" as a domain name of MFP 100A; an area 332 to allocate a device searching protocol; and an area 333 to display the remaining capacity of second RAM 23 of MFP 100A. Allocation state display area 340 displays an allocation state of MFP 100B, and includes: an area 341 to display "MFP-B" as a domain name of MFP 100B; an area 342 to allocate a device searching protocol; and an area 343 to display the remaining capacity of second RAM 23 of MFP 100B. Allocation state display area 350 displays an allocation state of MFP 100C, and includes: an area 351 to display "MFP-C" as a domain name of MFP 100C; an area 352 to allocate a device searching protocol; and an area 353 to display the remaining capacity of second RAM 23 of MFP 100C. Allocation state display area 360 displays an allocation state of MFP 100D, and includes: an area 361 to display "MFP-D" as a domain name of MFP 100D; an area 362 to allocate a device searching protocol; and an area 363 to display the remaining capacity of second RAM 23 of MFP 100D.

Icons 321 to 324 included in upon-execution capacity display area 320, upon being instructed by the user, come into a state of being able to move to any one of allocation display areas 330, 340, 350 and 360. The user performs dragging any one of icons 321 to 324 to drop into any one of allocation display areas 330, 340, 350 and 360, and thus may input an operation of allocating each of the four device searching protocols to any one of MFPs 100A to 100D.

In FIG. 6, an icon 321A indicating that icon 321 has been dropped is displayed in area 332 of allocation state display area 330, and it is indicated that icon 321 has been dragged and dropped into allocation display area 330 so that SSDP protocol is allocated to MFP 100A. Further, "128 kB" is displayed in area 333, as the remaining capacity of second RAM 23 of MFP 100A.

An icon 322A indicating that icon 322 has been dropped is displayed in area 342 of allocation state display area 340, and it is indicated that icon 322 has been dragged and dropped into allocation display area 340 so that WSD protocol is allocated to MFP 100B. Further, "44 kB" is displayed in area 343, as the remaining capacity of second RAM 23 of MFP 100B.

Nothing is displayed in area 352 of allocation state display area 350, and it is indicated that any one of the four device searching protocols is not allocated to MFP 100C. Further, "20 kB" is displayed in area 353, as the remaining capacity of second RAM 23 of MFP 100C, which is the same as the free capacity thereof.

An icon 323A and an icon 324A indicating that icon 323 and icon 324 have been dropped are displayed in area 362 of allocation state display area 360, and it is indicated that icons 323 and 324 have been dragged and dropped into allocation display area 360 so that SLP and mDNS protocols are allocated to MFP 100D. Further, "192 kB" is displayed in area 363, as the remaining capacity of second RAM 23 of MFP 100D.

Figure 7:
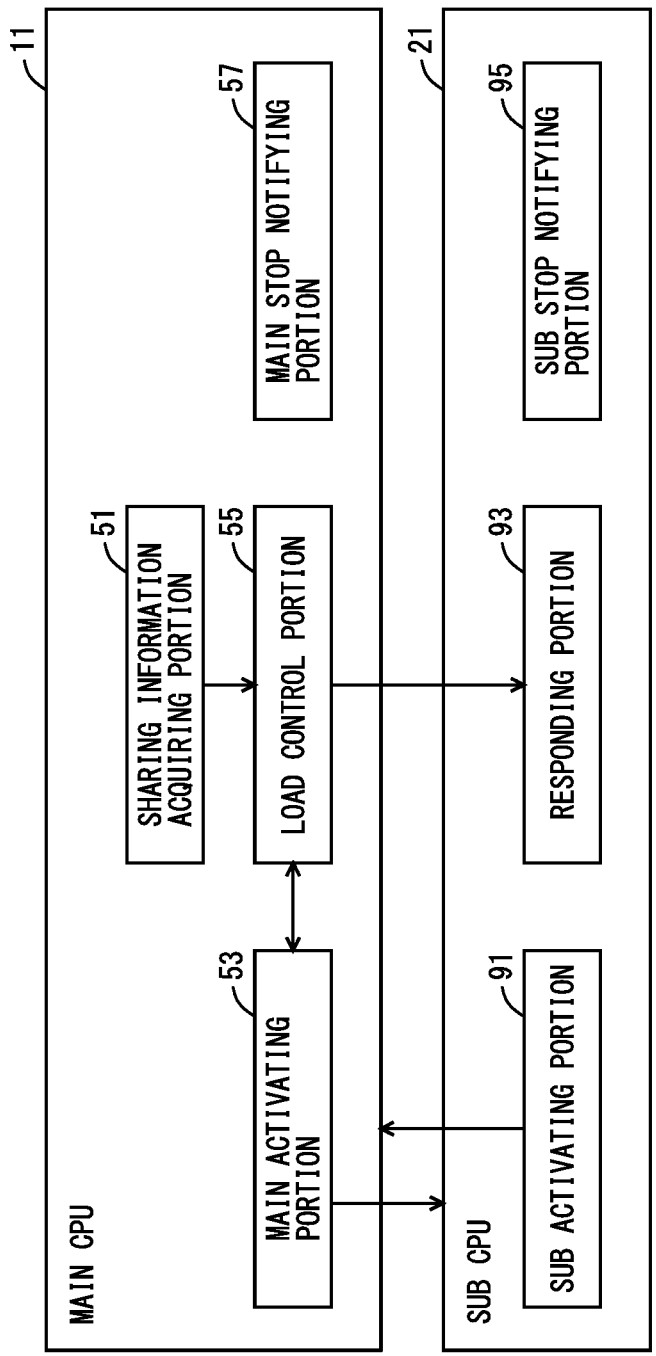
FIG. 7 is a block diagram showing an example of the functions of a main CPU and a sub CPU included in an MFP according to the first embodiment.

FIG. 7 is a block diagram showing an example of the functions of a main CPU and a sub CPU included in an MFP according to the first embodiment. The functions of main CPU 11 shown in FIG. 7 are formed in main CPU 11 as main CPU 11 executes part of a protocol sharing setting program, while the functions of sub CPU 21 shown in FIG. 7 are formed in sub CPU 21 as sub CPU executes another part of a protocol sharing program and a response program. Referring to FIG. 7, main CPU 11 includes: an sharing information acquiring portion 51; a main activating portion 53; a load control portion 55; and a main stop notifying portion 57.

Sharing information acquiring portion 51 receives protocol in-charge information or protocol request information for each of the four device searching protocols. Sharing information acquiring portion 51 acquires the protocol in-charge information or the protocol request information that communication portion 205 receives from management PC 200A. Sharing information acquiring portion 51 stores the protocol in-charge information or the protocol request information acquired for each of the four device searching protocols, in HDD 115, while outputting to load control portion 55.

Main activating portion 53 activates sub CPU 21 upon establishment of a first condition, and in response to an event that after sub CPU 21 has been activated an activation completion signal indicating the activation of sub CPU 21 is input from sub CPU 21, main activating portion 53 controls first power supply circuit 15 to cause it to shut off power supply to main CPU 11 and first RAM 13. The first condition is a predetermined condition for switching to a power-saving mode in which power consumption is smaller than in the normal mode. The first condition may be arbitrarily determined, for example, as the case where operation portion 163 refrains from accepting an operation by the user for a predetermined period of time, or the case where communication I/F portion refrains from externally accepting a job for a predetermined period of time.

Load control portion 55 receives from sharing information acquiring portion 51 input of the protocol in-charge information or the protocol request information for each of the four device searching protocols. Here, it is assumed, by way of example, that the protocol in-charge information of SSDP protocol is input and the protocol request information of each of WSD, SLP and mDNS protocols is input.

Load control portion 55, in the case where main activating portion 53 activates sub CPU 21, when sub CPU 21 is activated, causes sub CPU 21 to execute a response program corresponding to the device searching protocol set in the in-charge device. Specifically, since the protocol in-charge information input from sharing information acquiring portion 51 includes the protocol identification information of SSDP protocol, load control portion 55 causes sub CPU 21 to load the response program corresponding to SSDP protocol into second RAM 23. Thus, sub CPU 21 comes into a state of being able to execute the response program corresponding to SSDP protocol. The response program corresponding to SSDP protocol is a program defining a process of, in the case where a packet including a request of SSDP protocol is received, returning a packet to respond to the request.

Further, load control portion 55 causes sub CPU 21 to refrain from executing a response program corresponding to the device searching protocol set in the request device. Specifically, load control portion 55 causes sub CPU 21 to refrain from loading the response program corresponding to each of WSD, SLP and mDNS protocols. Thus, in the case where a packet including a request corresponding to any one of WSD, SLP and mDNS protocols is received, sub CPU 21 discards the packet so as not to respond to the request.

Main stop notifying portion 57, when power supply is stopped from first power supply circuit 15, controls communication I/F portion 113 to transmit a power-off signal to management PC 200A.

Sub CPU 21 includes: a sub activating portion 91; a responding portion 93; and a sub stop notifying portion 95. In the case where a packet that communication I/F portion 113 externally receives is a unicast packet, sub activating portion 91 activates main CPU 11, and after main CPU 11 has been activated, controls second power supply circuit 25 to cause it to shut off power supply to sub CPU 21 and second RAM 23.

When main CPU 11 is activated by sub CPU 21, main CPU 11 executes a boot program stored in ROM 17, and loads into first RAM 13 for execution a program determined by the boot program. Further, in the case where the protocol in-charge information is stored in HDD 115, main CPU 11 loads into first RAM 13 for execution a response program corresponding to a device searching protocol specified by protocol identification information included in the protocol in-charge information. In the case where the protocol request information is stored in HDD 115, main CPU 11 refrains from loading into first RAM 13 a response program corresponding to a device searching protocol specified by protocol identification information included in the protocol request information.

Responding portion 93 includes a task that sub CPU 21 is controlled by load control portion 55 of main CPU 11 to execute a response program corresponding to SSDP protocol. Responding portion 93 executes the response program, and receives a packet including a request corresponding to SSDP protocol (hereinafter, referred to as a "request packet") among the packets received by communication I/F portion 113. A port number is determined previously for the device searching protocol, and the port number is included in a predetermined field of the packet, for example, a UDP field. Responding portion 93 determines, on the basis of the port number included in the packet, whether or not the packet corresponds to SSDP protocol.

Responding portion 93, in response to reception of the request packet, generates a reply packet, and returns the reply packet by unicast to a transmitting source of the request packet, here, PC 200A. The reply packet includes, in addition to the device identification information of the device itself, device identification information of a request device. Responding portion 93 reads out from HDD 113 protocol request information including protocol identification information of SSDP protocol, and acquires device identification information of each of MFPs 100B to 100D as the request device, stored in the protocol request information being read out.

Sub stop notifying portion 95, when power supply is stopped from second power supply circuit 25 in a state where sub activating portion 91 does not activate main CPU 11, controls communication I/F portion 113 to transmit the power-off signal to management PC 200A.

Figure 8:
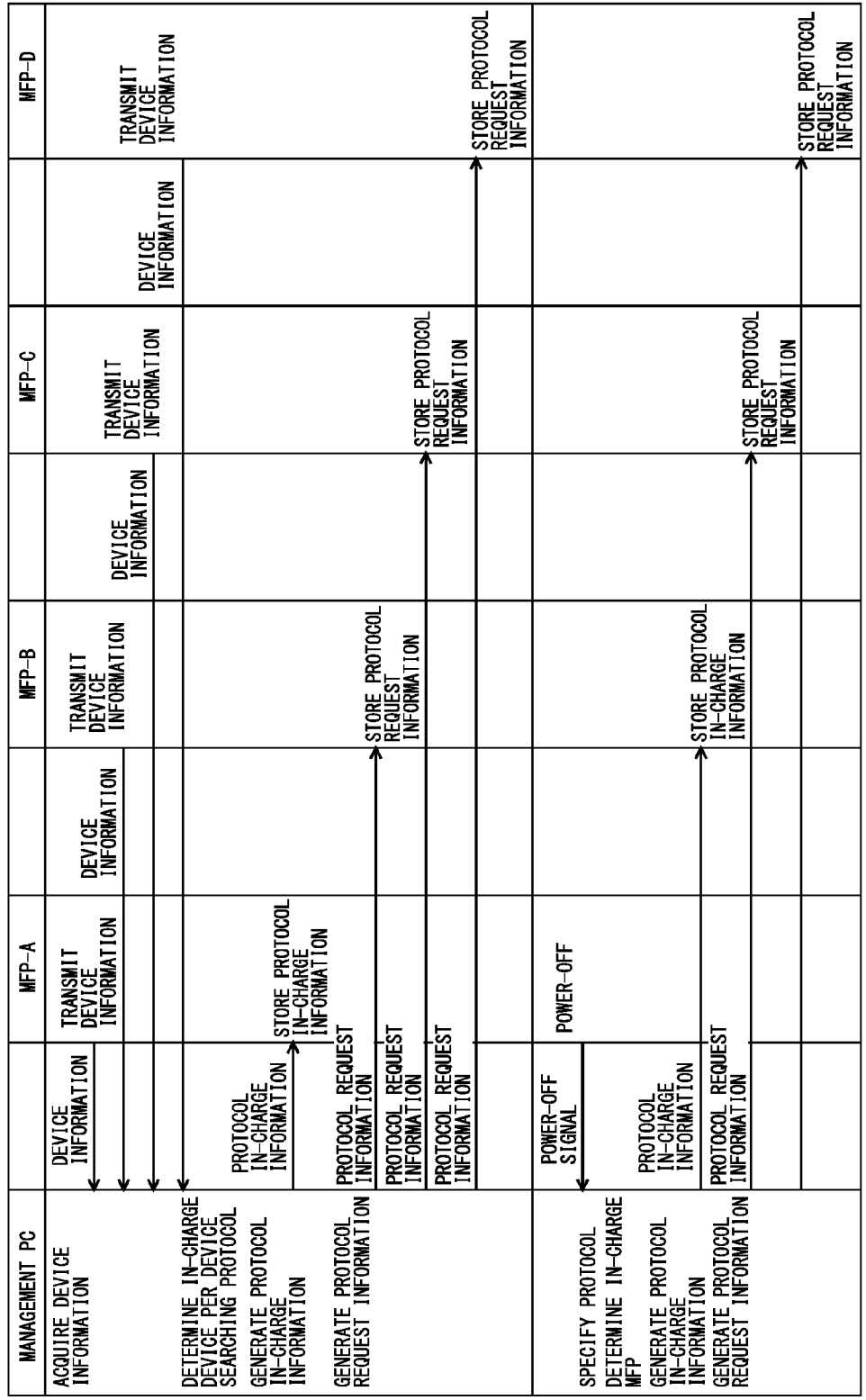
FIG. 8 shows an example of a chronological flow of information during a period in which a main CPU of each of four MFPs is in operation in a management system according to the first embodiment.

FIG. 8 shows an example of a chronological flow of information during a period in which a main CPU of each of four MFPs is in operation in the management system according to the first embodiment. FIG. 8 shows the flow of time from top to bottom along the longitudinal axis, and each of processes executed by management PC 200A, and MFPs 100A to 100D. In FIG. 8, PC 200A is referred to as "management PC", and each of MFPs 100A to 100D is referred to as "MFP-A", "MFP-B", "MFP-C" and "MFP-D", respectively.

Referring to FIG. 8, management PC 200A acquires device information from each of MFPs 100A to 100D. The device information includes ability information and device identification information. Then, management PC 200A, on the basis of the ability information of each of MFPs 100A to 100D, determines an in-charge device for each of the four device searching protocols. In FIG. 8 shows, by way of example, the case of SSDP protocol among the four device searching protocols, and it is assumed, by way of example, that management PC 200A determines MFP 100A as the in-charge device which is in charge of SSDP protocol, and determines each of MFPs 100B to 100D as a request device which requests MFP 100A for SSDP protocol. As to other three protocols, the in-charge device and the request device are different, however, the setting respectively for the in-charge device and the request device is the same, and thus a detailed description thereof will not be repeated.

Management PC 200A, in order to set MFP 100A as the in-charge device, generates protocol in-charge information corresponding to SSDP protocol, and causes MFP 100A to store the protocol in-charge information. The protocol in-charge information includes protocol identification information of SSDP protocol, and device identification information of each of all request devices which are here MFPs 100B to 100D.

Further, management PC 200A, in order to set each of MFPs 100B to 100D as the request device of SSDP protocol, generates protocol request information corresponding to SSDP protocol, and causes each of all request devices which are here MFPs 100B to 100D to store the protocol request information. The protocol request information corresponding to SSDP protocol includes protocol identification information for identifying SSDP protocol.

Then, when the power of MFP 100A as the in-charge device is turned off, MFP 100A transmits to management PC 200A a power-off signal indicating that the power has been turned off. Management PC 200A, in response to reception of the power-off signal from MFP 100A as the in-charge device, on the basis of ability information of each of MFPs 100B to 100D other than MFP 100A, determines an in-charge device for each of the four device searching protocols. Here, it is assumed, by way of example, that management PC 200A determines MFP 100B as the in-charge device which is in charge of SSDP protocol, and determines each of MFPs 100C and 100D as a request device which requests MFP 100A for SSDP protocol. As to other three protocols, the in-charge device and the request device are different, however, the setting respectively for the in-charge device and the request device is the same, and thus a detailed description thereof will not be repeated.

Management PC 200A, in order to set MFP 100B as the in-charge device, generates protocol in-charge information corresponding to SSDP protocol, and causes MFP 100B to store the protocol in-charge information. The protocol in-charge information includes protocol identification information of SSDP protocol, and device identification information of each of all request devices which are here MFPs 100C and 100D.

Further, management PC 200A, in order to set each of MFPs 100C and 100D as the request device of SSDP protocol, generates protocol request information, and causes each of all request devices which are here MFPs 100C and 100D to store the protocol request information. The protocol request information corresponding to SSDP protocol includes protocol identification information for identifying SSDP protocol.

Figure 9:
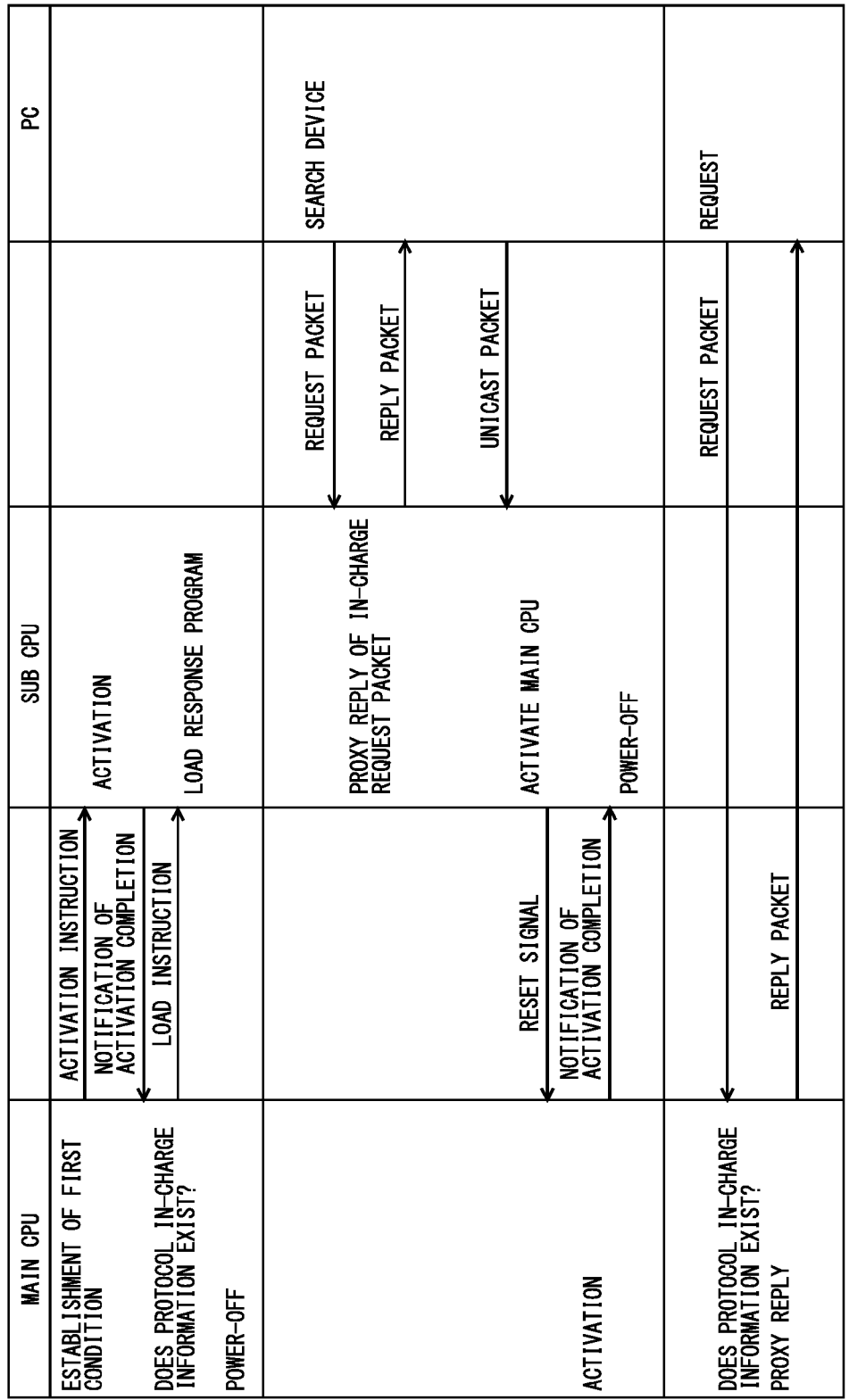
FIG. 9 shows an example of a chronological flow of information between a main CPU and a sub CPU of an MFP according to the first embodiment.

FIG. 9 is a diagram showing an example of a chronological flow of information between a main CPU and a sub CPU of an MFP according to the first embodiment. FIG. 9 shows the flow of time from top to bottom along the longitudinal axis, and each of processes executed between both main CPU 11 and sub CPU 21 included in MFP 100A, and PC 200B. In FIG. 9, the processes executed in each of main CPU 11 and sub CPU 21 included in MFP 100A, and PC 200B are shown in order from left to right.

Referring to FIG. 9, main CPU 11 determines whether or not a first condition has been established. If the first condition is established, main CPU 11 resets sub CPU 21 to be activated. When sub CPU 21 is reset by main CPU 11, for example, sub CPU 21 executes a boot program stored in HDD 115 to initialize second RAM 23. When sub CPU 21 is activated by main CPU 11, sub CPU 21 outputs an activation completion signal to main CPU 11.

Main CPU 11 determines whether or not protocol in-charge information is stored in HDD 115. If the protocol in-charge information is stored, main CPU 11 causes sub CPU 21 to load into second RAM 23 a response program corresponding to a device searching protocol specified by protocol identification information included in the protocol in-charge information. Here, since the protocol in-charge information including the protocol identification information of SSDP protocol is stored in HDD 115, main CPU 11 outputs to sub CPU 21 a load instruction for causing sub CPU 21 to load into second RAM 23 the response program corresponding to SSDP protocol. Then main CPU 11 controls first power supply circuit 15 to cause it to stop power supply. The load instruction may be outputted as a command to sub CPU 21, or sub CPU 21 may rewrite the boot program executed upon activation.

Sub CPU 21 executes a response program corresponding to SSDP protocol so as to receive a request packet corresponding to SSDP protocol. In FIG. 9 shows, by way of example, the case where management PC 200A transmits out in LAN 3 a request packet corresponding to SSDP protocol. Sub CPU 21, in response to reception of the request packet corresponding to SSDP protocol, generates a reply packet, and returns the generated reply packet to management PC 200A as the transmitting source of the request packet. The reply packet is a packet which includes device identification information of MFP 100A and device identification information of the request device. Sub CPU 21 reads out from HDD 115 protocol in-charge information including protocol identification information of SSDP protocol, and acquires the device identification information of the request device included in the protocol in-charge information.

Here, sub CPU 21, according to a command from main CPU 11, loads a response program corresponding to SSDP protocol into second RAM 23, however, does not load a response program corresponding to another device searching protocols. Therefore, even if communication I/F portion 113 receives a request packet which corresponds to any one of WSD, SLP and mDSN protocols, sub CPU 21 discards the request packet without processing.

In the case where communication I/F portion 113 receives a packet by unicast (hereinafter, referred to as "a unicast packet"), sub CPU 21 resets main CPU 11 to be activated. Here, it is assumed, by way of example, that management PC 200A transmits a unicast packet to MFP 100 A. Main CPU 11 is activated by sub CPU 21, and upon completion of activation, main CPU 11 notifies sub CPU 21 that activation has been completed. Sub CPU 21, in response to reception of a notification of completion of activation, controls second power supply circuit 25 to turn the power off. Main CPU 11 processes the unicast packet received by communication I/F portion 113.

Further, when main CPU 11 is activated by sub CPU 21, main CPU 11 executes a boot program stored in ROM 17 to initialize first RAM 13. Then main CPU 11 loads into first RAM 13 a program specified by the boot program, and determines whether to load a response program corresponding to each of the four device searching protocols in a manner as follows. Main CPU 11 determines whether or not protocol in-charge information is stored in HDD 115. If the protocol in-charge information is stored, main CPU 11 loads into first RAM 13 a response program corresponding to a device searching protocol specified by protocol identification information included in the protocol in-charge information. Here, since the protocol in-charge information including protocol identification information of SSDP protocol is stored in HDD 115, main CPU 11 loads into first RAM 13 a response program corresponding to SSDP protocol. Meanwhile, the protocol in-charge information including protocol identification information of another device searching protocols is not stored in HDD 115. Therefore, even if communication I/F portion 113 receives a request packet which corresponds to any one of WSD, SLP and mDNS protocols, main CPU 11 discards the request packet without processing.

Figure 10:
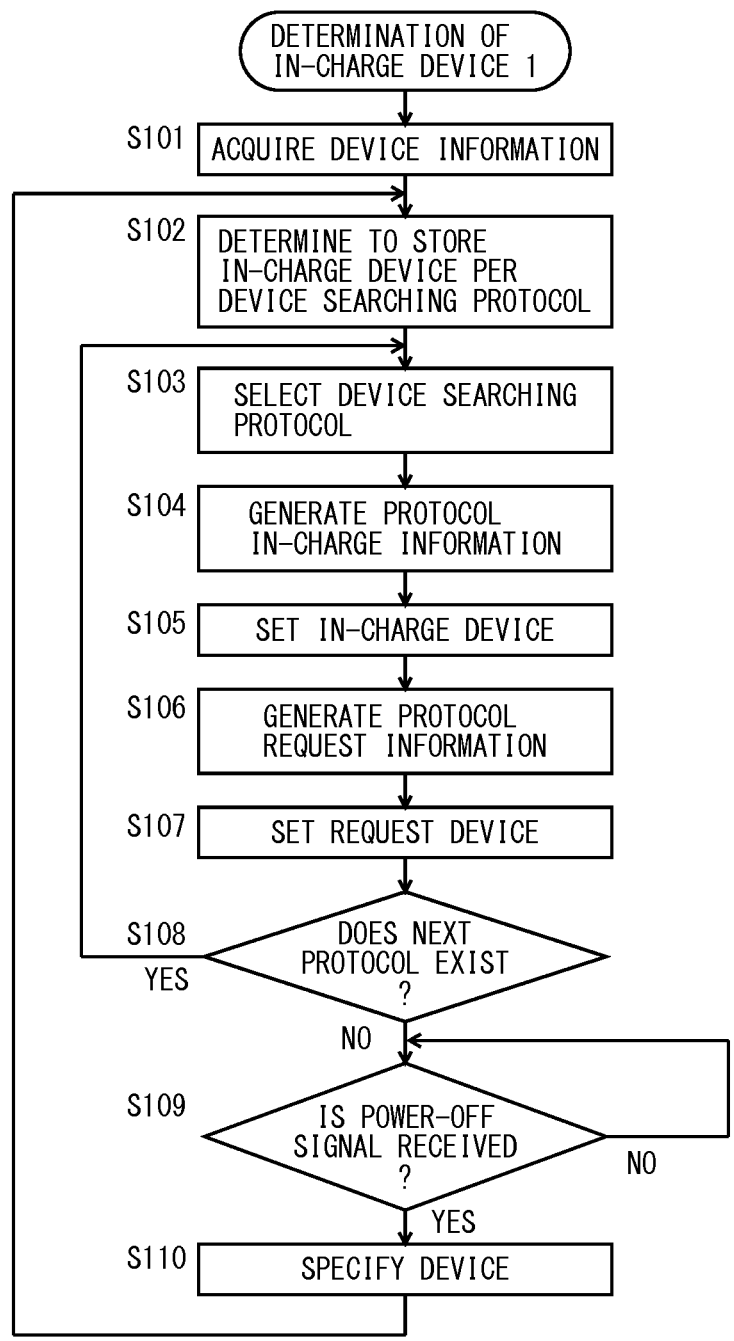
FIG. 10 is a flowchart illustrating an exemplary flow of an in-charge device determining process executed by a management PC according to the first embodiment.

FIG. 10 is a flowchart illustrating an exemplary flow of an in-charge device determining process executed by a management PC according to the first embodiment. The in-charge device determining process is a process executed by CPU 201 as CPU 201 included in management PC 200A executes an in-charge device determination program. Referring to FIG. 10, CPU 201 acquires device information from each of MFPs 100A to 100D (step S101). In the following step S102, CPU 201 determines an in-charge device for each of the four device searching protocols to store in HDD 204. A method of determining the in-charge device for each of the four device searching protocols includes displaying an allocation screen in display portion 206, and determining the in-charge device in accordance with an allocation operation that the user inputs to operation portion 207. The allocation operation is an operation to specify any one of MFPs 100A to 100D, for the four device searching protocols. CPU 201 stores in HDD 204 the sharing information which associates any one of MFPs 100A to 100D with each of the four device searching protocols.

In step S103, CPU 201 selects as a process target any one of the four device searching protocol, and generates protocol in-charge information corresponding to the device searching protocol as a process target (step S104). The protocol in-charge information includes protocol identification information of the device searching protocol as a process target, and device identification information of a request device other than the in-charge device determined corresponding the device searching protocol as a process target. In the following step S105, CPU 201 sets as the in-charge device a device which is determined as the in-charge device corresponding to the device searching protocol as a process target. Specifically, CPU 201 transmits the protocol in-charge information to the in-charge device so as to cause it to store the protocol in-charge information.

In step S106, CPU 201 generates protocol request information corresponding to the device searching protocol as a process target. The protocol request information includes protocol identification information of the device searching protocol as a process target. In the following step S107, CPU 201 sets as the request device a device other than the in-charge device determined corresponding to the device searching protocol as a process target. Specifically, CPU 201 transmits the protocol request information to the request device so as to cause it to store the protocol request information. If a plurality of request devices exist, CPU 201 causes all of the plurality of request devices to store the protocol request information.

In step S108, CPU 201 determines whether or not there exits a device searching protocol which is not selected as a process target. If a device searching protocol which is not selected as a process target exists, the process returns to step S103; otherwise, the process proceeds to step S109. Therefore, the processes in steps S104 to S107 are executed for all of the four device searching protocols.

In step S109, CPU 201 determines whether or not the power-off signal has been received. CPU 201 is in a standby mode until the power-off signal is received from any one of MFPs 100A to 100D, and upon reception of the power-off signal, the process proceeds to step S110.

In step S110, CPU 201 specifies a device which has transmitted the power-off signal, and the process returns to step S102. In step S102, in the case where the process proceeds from step S110, CPU 201 determines the in-charge device for each of the four device searching protocols, from among the remaining devices other than the device specified in step S110 among MFPs 100A to 100D.

Figure 11:
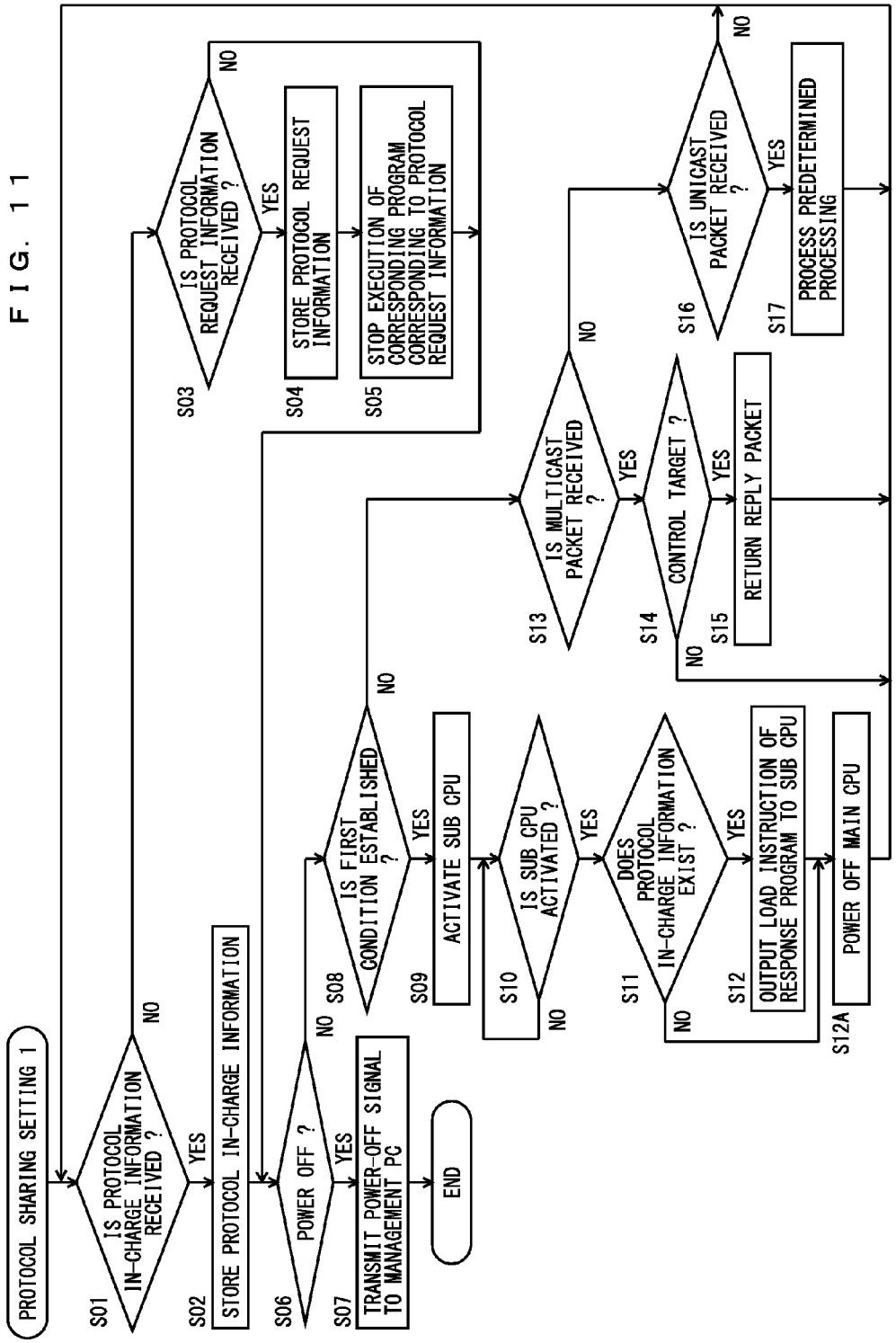
FIG. 11 is a flowchart illustrating an exemplary flow of a protocol sharing setting process executed by a main CPU of an MFP according to the first embodiment.

FIG. 11 is a flowchart illustrating an exemplary flow of a protocol sharing setting process executed by a main CPU of an MFP according to the first embodiment. In the case of being activated upon application of power, or in the case of being activated by sub CPU 21, main CPU 11 included in MFP 100A executes a boot program to initialize first RAM 13, and loads a predetermined program. The protocol sharing setting process shown in FIG. 11 is a process executed by main CPU 11 as main CPU 11 executes the protocol sharing setting program.

Referring to FIG. 11, main CPU 11 determines whether or not protocol in-charge information is received from management PC 200A (step S01). If the protocol in-charge information is received, the process proceeds to step S02; otherwise, the process proceeds to step S03. In step S02, main CPU 11 stores the received protocol in-charge information in HDD 115, and the process proceeds to step S06.

In step S03, main CPU 11 determines whether or not protocol request information is received from management PC 200A. If the protocol request information is received, the process proceeds to step S04; otherwise, the process proceeds to step S06. In step S04, main CPU 11 stores the received protocol request information in HDD 115, and the process proceeds to step S05. In step S05, main CPU 11 stops execution of a response program corresponding to the protocol request information received in step S03, and the process proceeds to step S06. The response program corresponding to the protocol request information is a response program which corresponds to a device searching protocol specified by protocol identification information included in the protocol request information.

In step S06, main CPU 11 determines whether or not the power has been turned off. When power supply from first power supply circuit 15 is stopped, main CPU 11 determines that the power has been turned off. If the power has been turned off, the process proceeds to step S07; otherwise, the process proceeds to step S08. In step S07, main CPU 11 transmits the power-off signal to management PC 200, and the process is then terminated.

In step S08, main CPU 11 determines whether or not a first condition is established. The first condition is a condition which is predetermined for shifting to the power-saving mode. If the first condition is established, the process proceeds to step S09; otherwise, the process proceeds to step S13. In step S09, main CPU 11 activates sub CPU 21, and the process proceeds to step S10. In step S10, main CPU 11 is in a standby mode until sub CPU 21 is activated (NO in step S10), and when sub CPU 21 is activated (YES in step S10), the process proceeds to step S11. In step S11, main CPU 11 determines whether or not the protocol in-charge information is stored in HDD 115. If the protocol in-charge information is stored, the process proceeds to step S12; otherwise, the process returns to step S01. In step S12, main CPU 11 outputs a load instruction of a response program to sub CPU 21, and the process proceeds to step S12A. The response program is a response program which corresponds to a device searching protocol specified by protocol identification information included in the protocol in-charge information stored in HDD 115 in step S02. In step S12A, main CPU 11 controls first power supply circuit 15 so as to turn off the power, and the process returns to step S01.

In step S13, main CPU 11 determines whether or not a packet by multicast has been received. If a packet by multicast has been received, the process proceeds to step S14; otherwise, the process proceeds tot step S16. In step S14, main CPU 11 determines whether or not the received packet is a process target. If the received packet corresponds to a device searching protocol specified by protocol identification information included in the protocol in-charge information stored in HDD 115 in step S02, main CPU 11 determines the received packet is a process target. A port number included in the received packet may be used for determination of a process target. If the received packet is a process target, the process proceeds to step S15; otherwise, the process returns to step S01.

In step S15, main CPU 11 returns a reply packet, and the process returns to step S01. The reply packet includes device identification information of the device itself, and device identification information of a request device included in the protocol in-charge information stored in HDD 115 in step S02.

In step S16, main CPU 11 determines whether or not a packet by unicast has been received. If a packet by unicast has been received, the process proceeds to step S17; otherwise, the process returns to step S01. In step S17, main CPU 11 executes a process determined by the received packet by unicast, and the process returns to step S01.

It is noted that the processes in steps S13 to S15 are executed by main CPU 11 as main CPU 11 executes a response program corresponding to a device searching protocol specified by protocol identification information included in the protocol in-charge information stored in HDD 115 in step S02.

Figure 12:
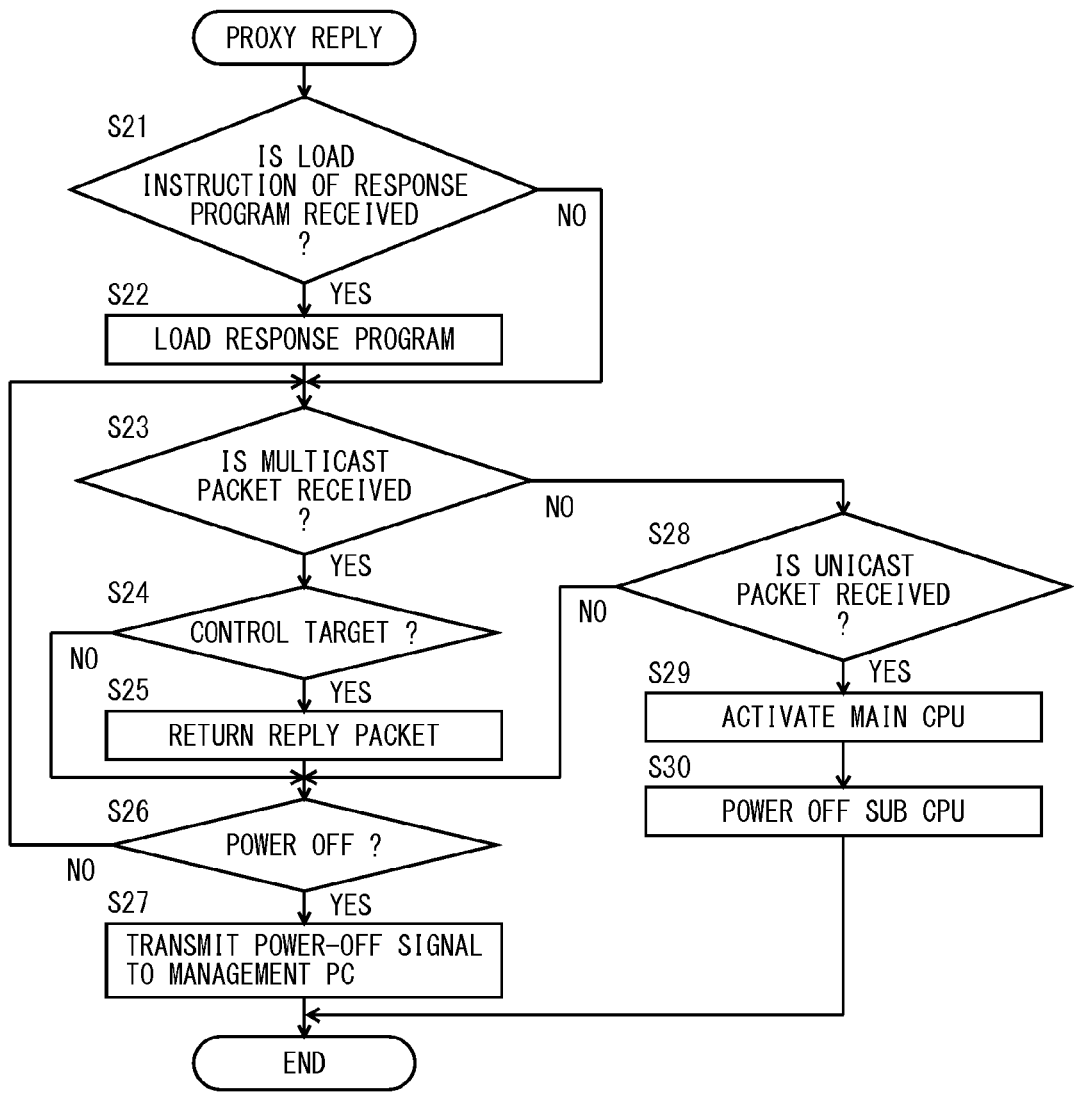
FIG. 12 is a flowchart illustrating an exemplary flow of a proxy reply process executed by a sub CPU of an MFP according to the first embodiment.

FIG. 12 is a flowchart illustrating an exemplary flow of a proxy reply process executed by a sub CPU of an MFP according to the first embodiment. Sub CPU 21 included in MFP 100A is activated by main CPU 11, and upon activation, sub CPU 21 executes a boot program to initialize second RAM 23, and load into second RAM 23 for execution a program predetermined by the boot program and a program determined by main CPU 11.

Referring to FIG. 12, sub CPU 21 determines whether or not a load instruction of a response program has been input from main CPU 11 (step S21). If the load instruction of a response program has been input, the process proceeds to step S22; otherwise, the process proceeds to step S23. In step S22, sub CPU 21 loads into second RAM 23 a response program specified by the load instruction of a response program, and the process proceeds to step S23. Here, it is assumed, by way of example, that a response program corresponding to SSDP protocol is loaded into second RAM 23.

In step S23, sub CPU 21 determines whether or not a packet by multicast has been received. If the packet by multicast has been received, the process proceeds to step S24; otherwise, the process proceeds to step S28. In step S24, sub CPU 21 determines whether or not the received packet is a process target. If the received packet corresponds to a device searching protocol specified by protocol identification information included in the protocol in-charge information stored in HDD 115, sub CPU 21 determines the received packet is a process target. A port number included in the received packet may be used for determination of a process target. If the received packet is a process target, the process proceeds to step S25; otherwise, the process proceeds to step S26. Therefore, since a response program is not loaded into second RAM 23 as long as a load instruction thereof is received from main CPU 11, in the case where a packet corresponding to a device searching protocol which corresponds to the response program is received, sub CPU 21 discards the packet without processing.

In step S25, sub CPU 21 returns a reply packet, and the process proceeds to step S26. The reply packet includes device identification information of the device itself, and device identification information of a request device included in the protocol in-charge information stored in HDD 115.

In step S28, sub CPU 21 determines whether or not a packet by unicast has been received. If a packet by unicast has been received, the process proceeds to step S29; otherwise, the process proceeds to step S26. In step S29, sub CPU 21 activates main CPU 11, and the process proceeds to step S30. In step 30, sub CPU 21 causes second power supply circuit 25 to stop supplying the power, and the process is then terminated.

In step S26, sub CPU 21 determines whether or not the power has been turned off. When power supply from second power supply circuit 25 is stopped, sub CPU 21 determines that the power has been turned off. If the power has been turned off, the process proceeds to step S27; otherwise, the process returns to step S23. In step S27, sub CPU 21 transmits the power-off signal to management PC 200, and the process is then terminated.

It is noted that the processes in steps S23 to S25 are executed by sub CPU 21 as sub CPU 21 executes a response program.

As described above, in the management system according to the first embodiment, management PC 200 determines as an in-charge device any one of four MFPs 100A to 100D for each of the four device searching protocols. Further, in each of four MFPs 100A to 100D, upon establishment of a first condition such as a sleeping shift condition, for example, sub CPU 21 is activated while main CPU 11 is terminated. This allows reducing power consumption. Further, when sub CPU 21 is activated by main CPU 11, in the case where the protocol in-charge information is stored in HDD 115 and where the in-charge device is the device itself, sub CPU 21 loads into second RAM 23 a response program corresponding to an in-charge protocol; whereas in the case where the protocol request information is stored in HDD 115 and where the in-charge device is not the device itself, sub CPU 21 does not load a response program. Further, sub CPU 21 executes the response program which has been loaded into second RAM 23. For example, in the case where sub CPU 21 executes a response program in which the protocol request information corresponds to SSDP protocol, in response to reception of a request packet of SSDP protocol, sub CPU 21 refrains from activating main CPU 11 so as to return a replay packet including the device identification information of each of MFPs 100B to 100D as a request device. Therefore, since a reply to packets of the four device searching protocols can be shared by four MFPs 100A to 100D, even if second RAM 23 controlled by sub CPU 21 does not have storing capacity enough for loading four response programs corresponding to each of the four device searching protocols to be loaded, a reply can be returned in the same manner as the case where each of four MFPs 100A to 100D transmits a reply to packets of the four device searching protocols. This allows reducing power consumption in the plurality of MFPs 100A to 100D, while allowing the plurality of MFPs 100A to 100D to handle a plurality of device searching protocols streaming in LAN 3.

Further, management PC 200, which is different from the plurality of MFPs 100A to 100D, for each of the plurality of device searching protocols, determines as the in-charge device any one of the plurality of MFPs 100A to 100D. Therefore, management PC 200 manages the plurality of MFPs 100A to 100D, which allows simplifying a process executed in each of the plurality of MFPs 100A to 100D.

When the user designates a candidate device corresponding to each of the plurality of device searching protocols, among the plurality of MFPs 100A to 100D, remaining ability information indicating the ability of executing a response program corresponding to a device searching protocol which corresponds to the candidate device is displayed on the basis of the ability information of each of candidate devices. This allows providing the user of necessary information for the user to determine the candidate device among the plurality of MFPs 100A to 100D Further, the ability information of each of four MFPs 100A to 100D indicates free capacity of second RAM 23 of each of the MFPs. The remaining ability information of the candidate device indicates free capacity after that sub CPU 21 included in the candidate device has loaded the response program into second RAM 23. Therefore, when the user designates the candidate device, the free capacity after that the response program has been loaded into second RAM 23 included in the candidate device is displayed. This allows providing the user of the information which indicates whether or not the candidate device is able to execute the response program corresponding to the device searching protocol.

In the case where the protocol in-charge information is acquired, main CPU 11 executes a response program corresponding to a device searching protocol specified by protocol identification information included in the protocol in-charge information so as to return a reply packet including device identification information of one or more request devices included in the protocol in-charge information including protocol identification information of the device searching protocol, in response to a packet of a device searching protocol corresponding to the response program, the packet being externally received by multicast; whereas in the case where the protocol request information is acquired, main CPU 11 does not execute the response program corresponding to a device searching protocol specified by protocol identification information included in the protocol request information. Therefore, the in-charge device among MFPs 100A to 100D which is in charge of the device searching protocol is able to, on behalf of other MFPs, respond to the packet externally received by multicast, regardless of establishment of the first condition.

In the case where it is notified that the in-charge device stops, management PC 200, on the basis of the ability information of one or more remaining image processing apparatuses other than the in-charge device among the plurality of MFPs 100A to 100D, determine as a new in-charge device any one of one or more remaining image processing apparatuses, for each of the four device searching protocols. This allows the plurality of MFPs 100A to 100D to handle the plurality of device searching protocols.

Further, main CPU 11 rewrites a boot program that sub CPU 21 reads out upon activation, so as to cause sub CPU 21 to load a response program into second RAM 23. This allows simplifying a setting for sub CPU 21 whether or not to execute the response program.

In the foregoing first embodiment, management system 1 has been described by way of example. However, it is needless to say that the present invention can be understood as a protocol sharing method for causing management PC 200A to execute the in-charge device determining process shown in FIG. 10, and causing each of MFPs 100A to 100D to execute the protocol sharing setting process shown in FIG. 11 and the proxy reply process shown in FIG. 12, as well as a protocol sharing program for causing main CPU 11 and sub CPU 21 included in each of MFPs 100A to 100D to execute the protocol sharing method.

Second Embodiment

In management system 1A according to the second embodiment, a parent device previously designated among MFPs 100A to 100D has the same functions as of management PC 200A in the first embodiment. Here, it is assumed, by way of example, that MFP 100A is the parent device for MFPs 100B to 100D, which has the same functions as of PC 200A in the first embodiment. Therefore, management PC 200A in the first embodiment is not required in management system 1A in the second embodiment. The description below will primarily focus on the different points between management system 1A in the second embodiment and management system 1 in the first embodiment.

Figure 13:
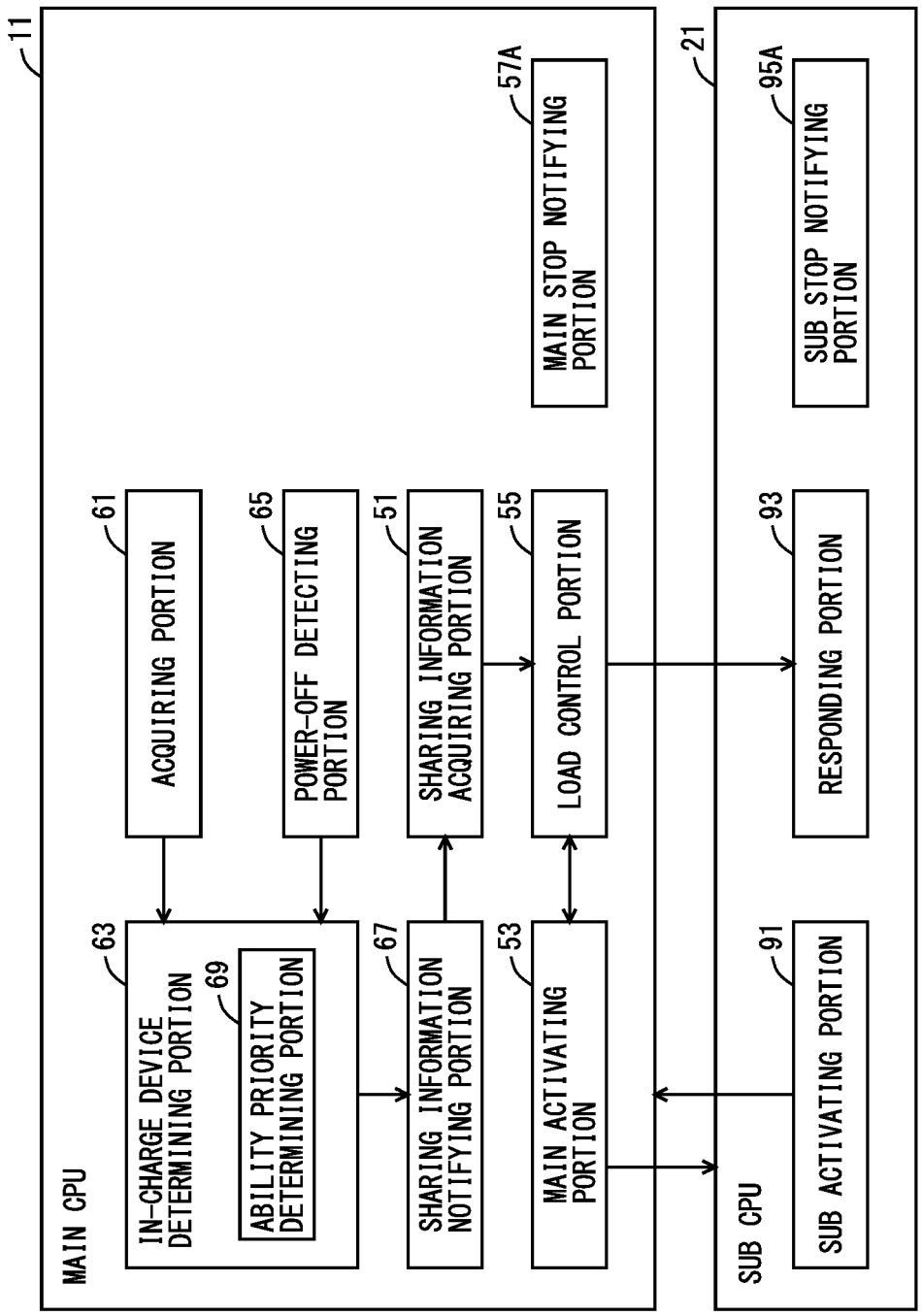
FIG. 13 is a block diagram shows an example of the functions of a main CPU and a sub CPU included in an MFP as a parent device according to the second embodiment.

FIG. 13 is a block diagram showing an example of the functions of a main CPU and a sub CPU included in an MFP as a parent device according to the second embodiment. The functions of main CPU 11 included in MFP 100A shown in FIG. 13 are formed in main CPU 11 as main CPU 11 executes an in-charge device determination program and part of protocol sharing setting program, while the functions of sub CPU 21 are formed in sub CPU 21 as sub CPU 21 executes another part of protocol sharing setting program and a response program.

Referring to FIG. 13, the functions different from the functions shown in FIG. 7 are as follows: main CPU 11 additionally includes an acquiring portion 61, an in-charge device determining portion 63, a power-off detecting portion 65, and a sharing information notifying portion 67; and main stop notifying portion 57 and sub stop notifying portion 95 are changed to a main stop notifying portion 57A and a sub stop notifying portion 95A, respectively. Other functions are the same as of FIG. 7, and thus a detailed description thereof will not be repeated.

Acquiring portion 61 acquires device information from each of other MFPs 100B to 100D connected to LAN 3. In-charge device determining portion 63, on the basis of ability information of each of MFPs 100A to 100D, determines as an in-charge device any one of MFPs 100A to 100D for each of the four device searching protocols. In-charge device determining portion 63 includes an ability priority determining portion 69. Ability priority determining portion 69 previously stores in each of MFPs 100A to 100D upon-execution capacity of each of four response programs corresponding to each of the four device searching protocols. Ability priority determining portion 69, on the basis of upon-execution capacity of each of four response programs corresponding to each of the four device searching protocols as well as on the basis of storing capacity of each of MFPs 100A to 100D, determines as the in-charge device any one of MFPs 100A to 100D for each of the four device searching protocols. An allocation method may be determined arbitrarily but may be, for example, a method where four response programs corresponding to the four device searching protocols are allocated, in decreasing order of upon-execution capacity, to any one having the largest storing capacity among MFPs 100A to 100D, which allows determination of the in-charge device corresponding to the four device searching protocols. It is here assumed, by way of example, that: the upon-execution capacity for a response program increases in the order of SSDP, WSD, SLP and mDNS protocols; and the storing capacity increases in the order of MFPs 100A, 100B, 100C and 100D. At first, ability priority determining portion 69 allocates the response program corresponding to SSDP protocol, which requires the largest upon-execution capacity, to MFP 100A which has the largest storing capacity, so as to determine MFP 100A as the in-charge device for SSDP protocol. At this time, the storing capacity of MFP 100A is updated to a value obtained from subtracting the upon-execution capacity of the response program corresponding to SSDP protocol. Then the foregoing method is repeated by use of the updated storing capacity: the response program corresponding to WSD protocol, which requires next largest upon-execution capacity, is allocated to any one of MFPs 100A to 100D which has the largest storing capacity; and if MFP 100B has the largest storing capacity, ability priority determining portion 69 allocates to MFP 100B the response program corresponding to WSD protocol, so as to determine MFP 100B as the in-charge device for WSD protocol. Likewise, ability priority determining portion 69 determines any one of MFPs 100A to 100D as the in-charge device for each of the four device searching protocols.

It is here assumed, by way of example, that ability priority determining portion 69 determines MFP 100A as the in-charge device for SSDP protocol, MFP 100B as the in-charge device for WSD protocol, MFP 100C as the in-charge device for SLP protocol, and MFP 100D as the in-charge device for mDNS protocol.

It is noted that, priority may be set in advance in the order of MFPs 100A, 100B, 100C and 100D, so as to allocate each of the four device searching protocols in order of the priority.

In-charge device determining portion 63 outputs to sharing information notifying portion 67, a pair of protocol identification information and device identification information of the in-charged device determined for a device searching protocol specified by the protocol identification information, for each of the four device searching protocols.

Sharing information notifying portion 67 notifies each of MFPs 100A to 100D of sharing information. The sharing information includes protocol in-charge information and protocol request information. Since the in-charge device for SSDP protocol is the device itself, sharing information notifying portion 67 outputs the protocol in-charge information to sharing information acquiring portion 51, and transmits the protocol request information to a request device, i.e., each of MFPs 100B to 100D, via communication portion 205. Further, since the in-charge device for WSD protocol is MFP 100B, sharing information notifying portion 67 transmits the protocol in-charge information to MFP 100B. Since the request devices for WSD protocol are MFPs 100A, 100C and 100D, sharing information notifying portion 67 outputs the protocol request information to sharing information acquiring portion 51, while transmitting the protocol request information to each of MFPs 100C and 100D via communication portion 205.

Power-off detecting portion 65 detects a device among MFPs 100B to 100D, which has turned the power off. As described later, each of MFPs 100B to 100D, when the power is turned off, transmits to MFP 100A as a parent device a power-off signal indicating that the power has been turned off. Upon reception of the power-off signal, power-off detecting portion 65 detects that the power of the device which has transmitted the power-off signal has been turned off. Further, upon reception of the power-off signal, power-off detecting portion 65 outputs to in-charge device determining portion 63 a redetermination instruction including identification information of the device which has transmitted the power-off signal.

It is noted that power-off detecting portion 63 may make an inquiry, at an arbitrary timing, to each of MFPs 100B to 100D so as to detect whether power has been turned off or not. In this case, it is not necessary for each of MFPs 100B to 100D to transmit the power-off signal.

In response to the redetermination instruction being input from power-off detecting portion 65, in-charge device determining portion 63 determines, on the basis of the ability information of each of remaining devices among MFPs 100A to 100D other than a device specified by device identification information included in the redetermination instruction, any one of the remaining devices as the in-charge device, for each of the four device searching protocols. In the same manner as described above, in-charge device determining portion 63 determines an in-charge device which has large remaining capacity, for a device searching protocol corresponding to a response program which requires large upon-execution capacity. Sharing information notifying portion 67 transmits the protocol in-charge information or the protocol request information to each of the request device and the in-charge device redetermined for each of the four device searching protocols by in-charge device determining portion 63.

Main stop notifying portion 57A, when power supply is stopped from first power supply circuit 15, controls communication I/F portion 113 to transmit a power-off signal to the parent device. Sub stop notifying portion 95A, when power supply is stopped from second power supply circuit 25 in a state where sub activating portion 91 does not activate main CPU 11, controls communication I/F portion 113 to transmit the power-off signal to the parent device. In the present embodiment, it is assumed that the power of MFP 100A is not turned off since MFP 100A is the parent device. Therefore, main stop notifying portion 57A can function effectively in each of MFPs 100B to 100D.

Figure 14:
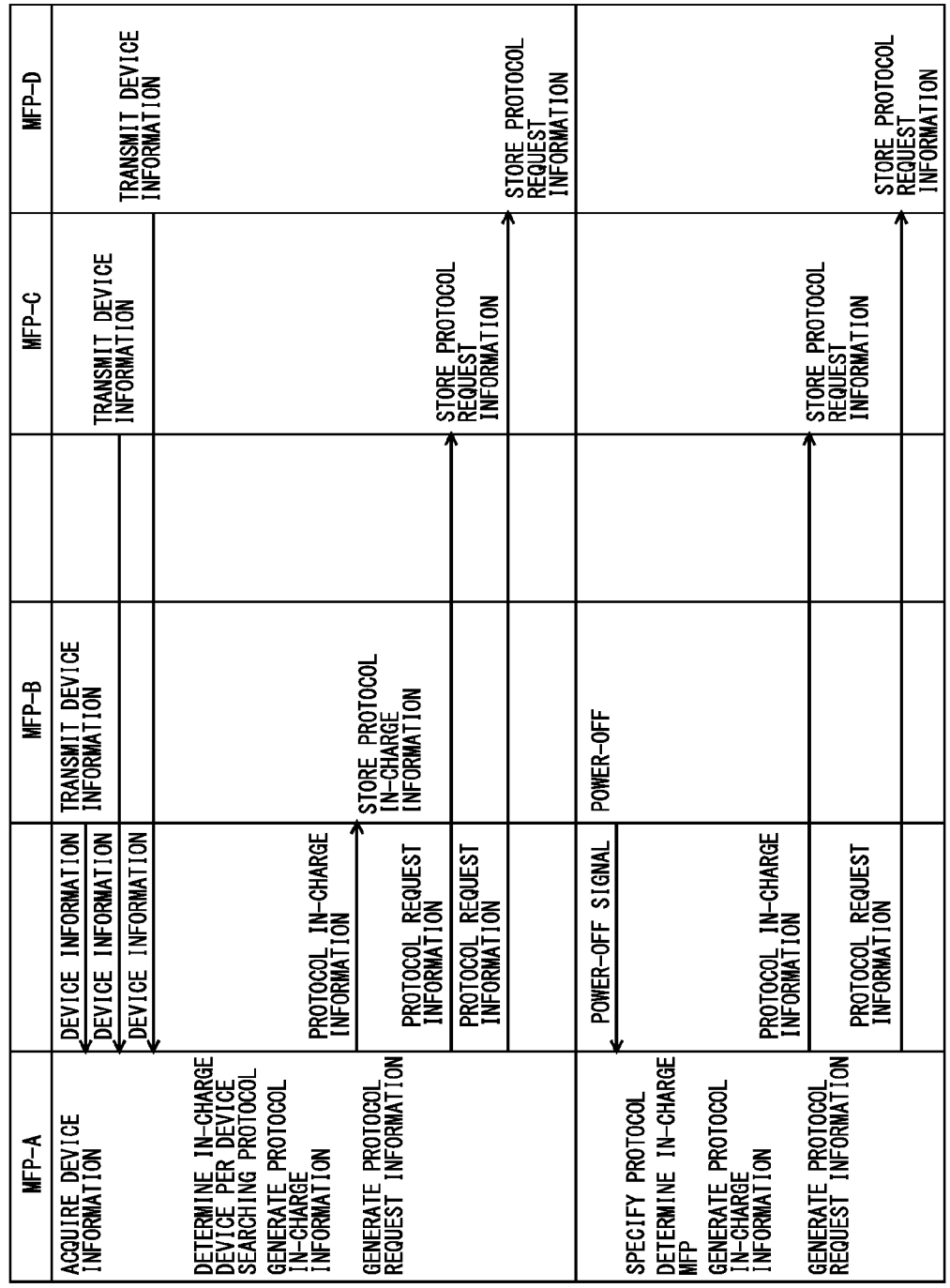
FIG. 14 shows an example of a chronological flow of information during a period in which a main CPU of each of four MFPs is in operation in a management system according to the second embodiment.

FIG. 14 shows an example of a chronological flow of information during a period in which a main CPU of each of four MFPs is in operation in the management system according to the second embodiment. FIG. 14 shows the flow of time from top to bottom along the longitudinal axis, and each of processes executed by MFPs 100A to 100D. In FIG. 14, each of MFPs 100A to 100D is referred to as "MFP-A", "MFP-B", "MFP-C" and "MFP-D", respectively.

Referring to FIG. 14, MFP 100A as the parent device acquires device information from each of MFPs 100B to 100D. Then, MFP 100A, on the basis of ability information of each of MFPs 100A to 100D, determines an in-charge device for each of the four device searching protocols. MFP 100A stores in advance upon-execution capacity of each of four response programs corresponding to the four device searching protocols which has been loaded into second RAM 23 by sub CPU 21 included in each of MFPs 100A to 100D. MFP 100A determines as the in-charge device any one of MFPs 100A to 100D for each of the four device searching protocols, on the basis of upon-execution capacity of each of four response programs corresponding to the four device searching protocols as well as on the basis of storing capacity of each of MFPs 100A to 100D.

It is assumed here, by way of example, that MFP 100A determines: MFP 100A as the in-charge device which is in charge of SSDP protocol; MFP 100B as the in-charge device which is in charge of WSD protocol; MFP 100C as the in-charge device which is in charge of SLP protocol; and MFP 100D as the in-charge device which is in charge of mDNS protocol. FIG. 14 shows, by way of example, the case of WSD protocol among the four device searching protocols is described, and it is assumed, by way of example, that MFP 100A as the parent device determines MFP 100B as the in-charge device which is in charge of WSD protocol, and determines each of MFPs 100A, 100C and 100D as a request device which requests MFP 100B for WSD protocol. As to other three protocols, the in-charge device and the request device are different, however, the setting respectively for the in-charge device and the request device is the same, and thus a detailed description thereof will not be repeated.

MFP 100A as the parent device, in order to set MFP 100B as the in-charge device for WSD protocol, generates protocol in-charge information corresponding to WSD protocol, and causes MFP 100B to store the protocol in-charge information. The protocol in-charge information includes protocol identification information of WSD protocol, and device identification information of each of all request devices which are here MFPs 100A, 100C and 100D.

Further, MFP 100A as the parent device, in order to set each of MFPs 100A, 100C and 100D as the request device of WSD protocol, generates protocol request information corresponding to WSD protocol, stores the protocol request information in HDD 115 included in the device itself, and causes each of all request devices which are here MFPs 100C and 100D to store the protocol request information. The protocol request information corresponding to WSD protocol includes protocol identification information for identifying WSD protocol.

Then, when the power of MFP 100B as the in-charge device is turned off, MFP 100B transmits to MFP 100A as the parent device a power-off signal indicating that the power has been turned off. MFP 100A as the parent device, in response to reception of the power-off signal from MFP 100B as the in-charge device, on the basis of ability information of each of MFPs 100A, 100C and 100D other than MFP 100B, determines an in-charge device for each of the four device searching protocols. Here, it is assumed, by way of example, that MFP 100A as the parent device determines MFP 100C as the in-charge device which is in charge of WSD protocol, and determines each of MFPs 100A and 100D as a request device which requests MFP 100C for WSD protocol. As to other three protocols, the in-charge device and the request device are different, however, the setting respectively for the in-charge device and the request device is the same, and thus a detailed description thereof will not be repeated.

MFP 100A as the parent device, in order to set MFP 100C as the in-charge device, generates protocol in-charge information corresponding to WSD protocol, and causes MFP 100C to store the protocol in-charge information. The protocol in-charge information includes protocol identification information of WSD protocol, and device identification information of each of all request devices which are here MFPs 100A and 100D.

Further, MFP 100A as the parent device, in order to set each of the device itself and MFP 100D as the request device of WSD protocol, generates protocol request information, stores the protocol request information in HDD 115 included in the device itself, and causes the request device which is here MFP 100D to store the protocol request information. The protocol request information corresponding to WSD protocol includes protocol identification information for identifying WSD protocol.

It is noted that the flow of information between main CPU 11 and sub CPU 21 included in each of MFPs 100A to 100D in the second embodiment is the same as the flow shown in FIG. 9.

According to the second embodiment, MFP 100A as the parent device executes the same process as the in-charge device determining process shown in FIG. 10. Therefore, in the same manner as described in the first embodiment, MFP 100A as the parent device determines as an in-charge device any one of MFPs 100A to 100D for each of the four device searching protocols, cause the in-charge device to store the protocol in-charge information, and causes the request device to store the protocol request information.

According to the second embodiment, main CPU 11 included in each of MFPs 100A to 100D executes the same process as the protocol sharing setting process in the first embodiment shown in FIG. 11, and sub CPU 21 included in each of MFPs 100A to 100D executes the same process as the proxy reply process in the first embodiment shown in FIG. 12. However, there is a difference in that: in step S07 of FIG. 11, the protocol sharing setting process in the first embodiment includes transmitting the power-off signal to management PC 200A; whereas the protocol sharing setting process in the second embodiment includes transmitting the power-off signal to MFP 100A as the parent device. In addition, there is a difference in that: In step S27 of FIG. 12, the proxy reply process in the first embodiment includes transmitting the power-off signal to management PC 200A; whereas the proxy reply process in the second embodiment includes transmitting the power-off signal to MFP 100A as the parent device.

As described above, PC 200A in the first embodiment is not required in management system 1A in the second embodiment.

Further, according to the second embodiment, management system 1A has the same effects as management system 1 in the first embodiment: MFP 100A as the parent device, on the basis of ability information of each of the plurality of MFPs 100A to 100D, determines an in-charge device in order from a device having spare ability. This allows any one of the plurality of MFPs 100A to 100D to execute a plurality of response programs corresponding to each of a plurality of device searching protocols.

Further, the ability information of each of the plurality of MFPs 100A to 100D indicates free capacity of second RAM 23 included in the MFP. Therefore, this allows any one of the plurality of MFPs 100A to 100D to, upon establishment of a first condition such as a sleeping shift condition, execute a plurality of response programs corresponding to each of a plurality of device searching protocols.

In management system 1A according to the second embodiment, MFP 100A functioning as the parent device which is a management device determines as an in-charge device any one of the plurality of MFPs 100A, to 100D for each of the plurality of device searching protocols. Further, sub CPU 21 included in each of the plurality of MFPs 100A to 100D and activated upon establishment of the first condition, in the case of being included in the in-charge device, loads a response program corresponding to an in-charge device searching protocol; whereas, in the case of not being included in the in-charge device, sub CPU 21 does not load the response program. Further, sub CPU 21 executes the response program loaded into second RAM 23, thereby responds to a request packet of a device searching protocol corresponding to the response program, the packet being externally received by multicast, and returns without activating main CPU 11 a reply packet including device identification information of other MFPs. Therefore, since a reply to packets of the plurality of device searching protocols can be shared by the plurality of MFPs 100A to 100D, even if second RAM 23 controlled by sub CPU 21 does not have storing capacity enough for loading a plurality of response programs corresponding to each of the plurality of device searching protocols, a reply can be returned in the same manner as the case where each of the plurality of MFPs 100A to 100D transmits a reply to packets of the plurality of device searching protocols. This allows reducing power consumption in the plurality of MFPs 100A to 100D, while allowing the plurality of MFPs 100A to 100D to handle the plurality of device searching protocols streaming in the network.

In the foregoing second embodiment, management system 1A has been described by way of example. However, it is needless to say that the present invention can be understood as a protocol sharing method for causing MFP 100A as the parent device which is a management device to execute the in-charge device determining process shown in FIG. 10, and causing each of MFPs 100A to 100D to execute the protocol sharing setting process shown in FIG. 11 and the proxy reply process shown in FIG. 12, as well as a protocol sharing program for causing main CPU 11 and sub CPU 21 included in each of MFPs 100A to 100D to execute the protocol sharing method.

Third Embodiment

Management system 1B according to the third embodiment does not include management PC 200A in the first embodiment, and the parent device in the second embodiment. Each of MFPs 100A to 100D performs arrangement for each other so as to determine an in-charge device and a request device. Therefore, PC 200A in the first embodiment is not required in management system 1B in the third embodiment.

Figure 15:
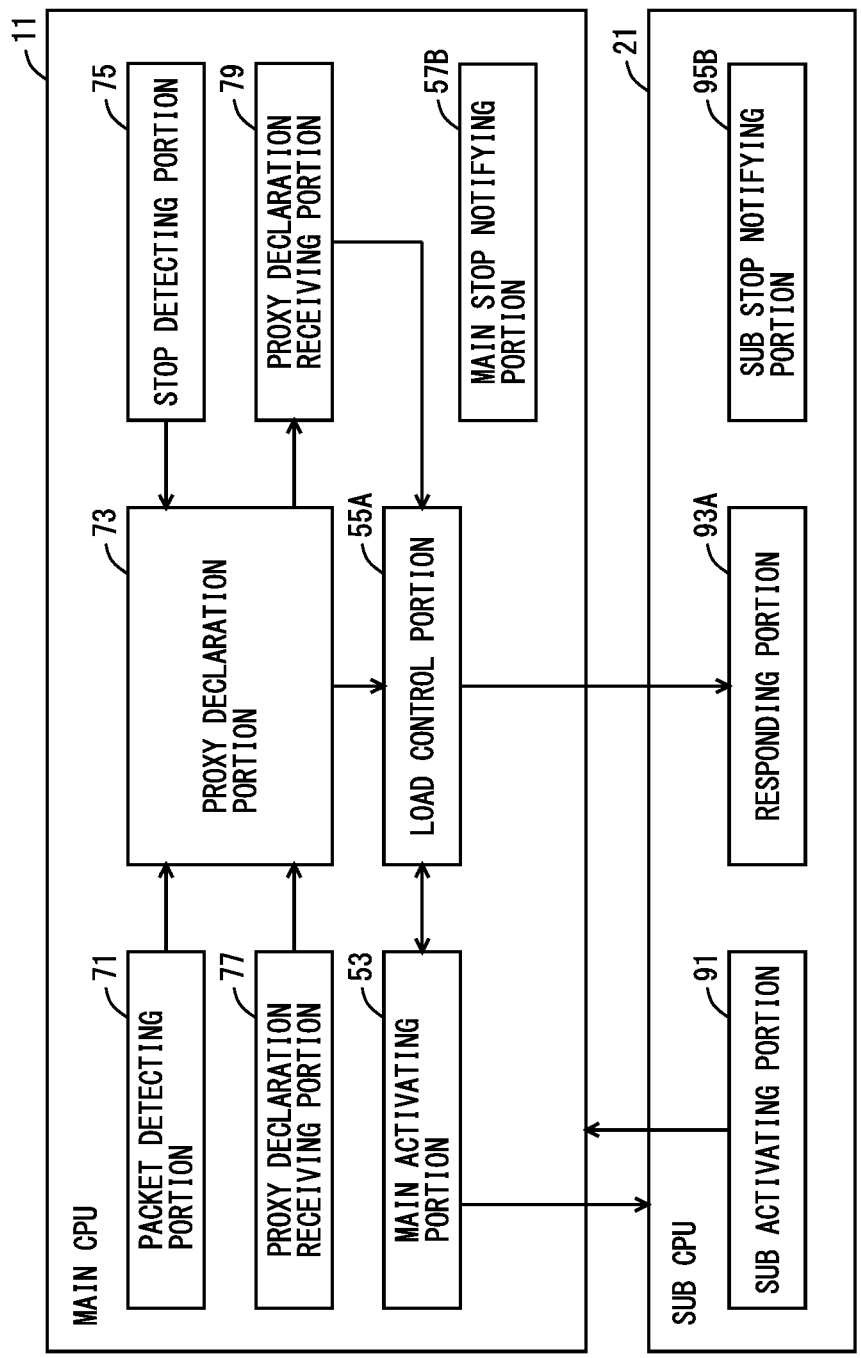
FIG. 15 is a block diagram showing an example of the functions of a main CPU and a sub CPU included in an MFP according to the third embodiment.

FIG. 15 is a block diagram showing an example of the functions of a main CPU and a sub CPU included in an MFP according to the third embodiment. The functions of main CPU 11 included in MFP 100A shown in FIG. 15 are formed in main CPU 11 as main CPU 11 executes part of protocol sharing setting program, while the functions of sub CPU 21 are formed in sub CPU 21 as sub CPU 21 executes another part of protocol sharing setting program and a response program.

Referring to FIG. 15, the functions of main CPU 11 and sub CPU 21 shown in FIG. 15 different from the functions shown in FIG. 7 are as follows: sharing information collecting portion 51 is deleted; a packet detecting portion 71, a proxy declaration portion 73, a stop detecting portion 75, a proxy declaration receiving portion 77 and a device information acquiring portion 79 are additionally included; and main stop notifying portion 57, sub stop notifying portion 95 and load control portion 55 are changed to a main stop notifying portion 57B, a sub stop notifying portion 95B and a load control portion 55A, respectively. Other functions are the same as of FIG. 7, and thus a detailed description thereof will not be repeated.

Packet detecting portion 71 detects, from among packets received by communication I/F portion 113, a packet of any one of the four device searching protocols. A port number is previously determined for each of the four device searching protocol, and the port number is included in a predetermined field of the packet. Packet detecting portion 71 detects, from among packets received by communication I/F portion 113, a packet which is identical to the port number of any one of the four device searching protocols. It is here assumed, by way of example, that a packet corresponding to SSDP protocol is detected. Packet detecting portion 71 returns a reply packet corresponding to the detected packet, while outputting to proxy declaration portion 73 protocol identification information of a device searching protocol corresponding to the detected packet.

Proxy declaration portion 73 transmits to each of other MFPs 100B to 100D a proxy declaration including the protocol identification information input from packet detecting portion 71 on the condition that the same protocol identification information as the protocol identification information input from packet detecting portion 71 has not been input from any one of other MFPs 100B to 100D by proxy declaration receiving portion 77 which will be described later. Further, proxy declaration portion 73 transmits a proxy declaration including the protocol identification information input from packet detecting portion 71 on a further condition that sub CPU 21 is able to execute a response program corresponding to a device searching protocol specified by the protocol identification information input from packet detecting portion 71. In the case where the remaining capacity of second. RAM 23 is larger than the upon-execution capacity for the response program corresponding to a device searching protocol specified by the protocol identification information input from packet detecting portion 71, proxy declaration portion 73 determines that sub CPU 21 is able to execute the response program.

When proxy declaration portion 73 transmits the proxy declaration including the protocol identification information input from packet detecting portion 71, proxy declaration portion 73 outputs an acquiring instruction to device information acquiring portion 79, while outputting the protocol identification information included in the proxy declaration to load control portion 55A.

Device information acquiring portion 79 acquires device identification information from each of MFPs 100B to 100D connected to LAN 3. Then device information acquiring portion 79 outputs to load control portion 55A the device identification information acquired from each of MFPs 100B to 100D.

Proxy declaration receiving portion 77 receives the proxy declaration from any one of other MFPs 100B to 100D. In the case where proxy declaration receiving portion 77 receives the proxy declaration from any one of other MFPs 100B to 100D, proxy declaration receiving portion 77 outputs to proxy declaration portion 73 the protocol identification information included in the received proxy declaration, while storing in-charge device information in HDD 115. The in-charge device information includes the protocol identification information included in the received proxy declaration and device identification information of a device which has transmitted the received proxy declaration.

Main stop notifying portion 57B, when power supply is stopped from first power supply circuit 15, controls communication I/F portion 113 to transmit a power-off signal to each of other MFPs 100B to 100D. Sub stop notifying portion 95B, when power supply is stopped from second power supply circuit 25 in a state where sub activating portion 91 does not activate main CPU 11, controls communication I/F portion 113 to transmit the power-off signal to each of other MFPs 100B to 100D.

Stop detecting portion 75, upon reception of the power-off signal from any one of other MFPs 100B to 100D, outputs to proxy declaration 73 device identification information of a device which has transmitted the power-off signal, while in the case where protocol in-charge information which will be described later is stored in HDD 115, deleting from the protocol in-charge information the device identification information of a device which has transmitted the power-off signal.

When device identification information is input from stop detecting portion 75, proxy declaration portion 73 determines whether or not in-charge device information including the device identification information is stored in HDD 115. In the case where the in-charge device information including the device identification information input from stop detecting portion 75 is stored, proxy declaration portion 73 transmits to each of other MFPs 100B to 100D a proxy declaration including protocol identification information included in the in-charge device information, on the condition that the proxy declaration including protocol identification information included in the in-charge device information has not been received from any one of other MFPs 100B to 100D, and then proxy declaration portion 73 deletes the in-charge device information from HDD 115. In the case where proxy declaration portion 73 transmits the proxy declaration to MFPs 100B to 100D, proxy declaration portion 73 outputs an acquiring instruction to device information acquiring portion 79, while outputting to load control portion 55A protocol identification information included in the proxy declaration.

When the protocol identification information is input from proxy declaration portion 73, load control portion 55A generates protocol in-charge information, and store the generated protocol in-charge information in HDD 115. The protocol in-charge information includes the protocol identification information input from proxy declaration portion 73, and the device identification information input from device information acquiring portion 79. Further, in the case where sub CPU 21 is activated, if the protocol in-charge information is stored in HDD 115, load control portion 55A controls sub CPU 21 to cause it to load into second RAM 23 a response program corresponding to a device searching protocol specified by protocol identification information included in the protocol in-charge information.

It is here assumed, by way of example, that protocol identification information of SSDP protocol is input from proxy declaration portion 73 to load control portion 55A. When the protocol identification information of SSDP protocol is input from proxy declaration portion 73, load control portion 55A generates protocol in-charge information including the protocol identification information of SSDP protocol and device identification information of each of MFPs 100B to 100D input from device information acquiring portion 79, so as to store the protocol in-charge information in HDD 115. Further, in response to sub CPU 21 being activated by main activating portion 53, on the basis of the protocol identification information of SSDP protocol included in the protocol in-charge information stored in HDD 115, load control portion 55A controls sub CPU 21 to cause it to load into second RAM 23 a response program corresponding to SSDP protocol. This allows sub CPU 21 to come into a state of being able to execute the response program corresponding to SSDP protocol.

Further, load control portion 55A causes sub CPU 21 to refrain from loading into second RAM 23 a response program corresponding to a device searching protocol among the four device searching protocols, other than the device searching protocol specified by the protocol identification information input from proxy declaration portion 73. Specifically, load control portion 55A causes sub CPU 21 to refrain from loading into second RAM 23 a response program corresponding to each of WSD, SLP and mDNS protocols. Thus, in the case where a packet including a request corresponding to any one of WSD, SLP and mDNS protocols is received, sub CPU 21 discards the packet so as not to respond to the request.

Responding portion 93A includes a task that sub CPU 21 is controlled by load control portion 55A of main CPU 11 to execute a response program corresponding to SSDP protocol. Responding portion 93A executes the response program, and receives a request packet corresponding to SSDP protocol among the packets received by communication I/F portion 113. Responding portion 93A, in response to reception of the request packet, generates a reply packet, and returns the reply packet by unicast to a transmitting source of the request packet, here, PC 200A. The reply packet includes, in addition to the device identification information of the device itself, device identification information of a request device. Responding portion 93A reads out device identification information of the request device included in the protocol in-charge information stored in HDD 113.

When main CPU 11 is activated by sub CPU 21, main CPU 11 executes a boot program, and loads into first RAM 13 for execution a program determined by the boot program. Further, in the case where the protocol in-charge information is stored in HDD 115, main CPU 11 loads into first RAM 13 for execution a response program corresponding to a device searching protocol specified by protocol identification information included in the protocol in-charge information.

Figure 16:
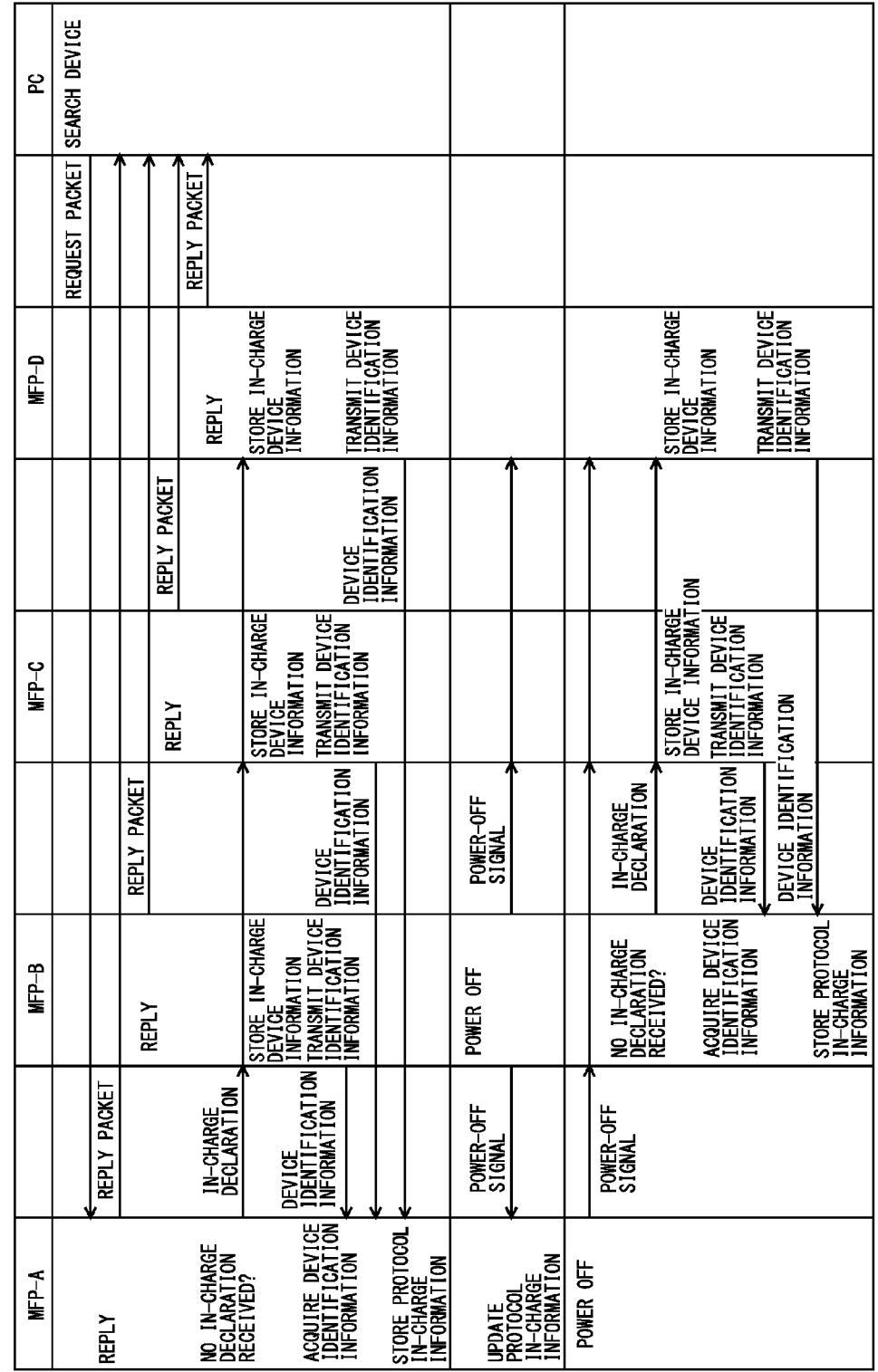
FIG. 16 shows an example of a chronological flow of information during a period in which a main CPU of each of four MFPs is in operation in a management system according to the third embodiment.

FIG. 16 shows an example of a chronological flow of information during a period in which a main CPU of each of four MFPs is in operation in the management system according to the third embodiment. FIG. 16 shows the flow of time from top to bottom along the longitudinal axis, and each of processes executed by MFPs 100A to 100D, and PC 200A. In FIG. 16, each of MFPs 100A to 100D is referred to as "MFP-A", "MFP-B", "MFP-C" and "MFP-D", respectively, and PC 200A is referred to as "PC".

Referring to FIG. 16, PC 200A transmits out in LAN 3 by multicast a request packet including a request corresponding to SSDP protocol. The request packet is received by each of MFPs 100A to 100D. Each of MFPs 100A to 100D returns a reply packet which responds to the request packet.

In the case where an in-charge declaration including protocol identification information of SSDP protocol is not received from any one of other MFPs 100B to 100D, MFP 100A transmits by multicast an in-charge declaration including protocol identification information of SSDP protocol to each of MFPs 100B to 100D. Thus, each of MFPs 100B to 100D among MFPs 100A to 100D, other than MFP 100A which has transmitted the in-charge declaration including protocol identification information of SSDP protocol, does not transmit out in LAN 3 the in-charge declaration including protocol identification information of SSDP protocol. It is here assumed, by way of example, that MFP 100A transmits out in LAN 3 the in-charge declaration including protocol identification information of SSDP protocol. In this case, each of MFPs 100B to 100D stores in HDD 115 in-charge device information including the protocol identification information of SSDP and the device identification information of MFP 100A.

MFP 100A acquires device identification information which is transmitted by each of other MFPs 100B to 100D after MFP 100A has transmitted the in-charge declaration. Then, MFP 100A generates protocol in-charge information, and stores the protocol in-charge information in HDD 115. The protocol in-charge information includes protocol identification information of SSDP included in the transmitted in-charge declaration, and the device identification information of each of MFPs 100B to 100D.

It is assumed, by way of example, that among MFPs 100B to 100D as request devices, the power of MFP 100B is turned off. When the power of MFP 100B is turned off, MFP 100B transmits a power-off signal by multicast. MFP 100A, in response to reception of the power-off signal from MFP 100B, updates the protocol in-charge information stored in HDD 115, and deletes the device identification information of MFP 100B from among pieces of the device identification information included in the protocol in-charge information.

Next, when the power of MFP 100A as the in-charge device is turned off, MFP 100A transmits the power-off signal by multicast to each of other MFPs 100B to 100D. Each of MFPs 100B to 100D, in response to reception of the power-off signal from MFP 100A, on the basis of the in-charge device information stored in HDD 115, acquires protocol identification information of SSDP protocol. Then, in the case where the in-charge declaration including the protocol identification information of SSDP protocol is not received from any one of other MFPs 100B to 100D, each of MFPs 100B to 100D transmits by multicast the in-charge declaration including the protocol identification information of SSDP protocol to each of MFPs 100B to 100D. It is here assumed, by way of example, that MFP 100B transmits the in-charge declaration. In this case, MFPs 100C and 100D store in HDD 115 in-charge device information including the protocol identification of SSDP protocol and the device identification information of MFP 100B.

MFP 100B acquires the device identification information which is transmitted by each of other MFPs 100C and 100D after MFP 100B has transmitted the in-charge declaration. Then, MFP 100B generates protocol in-charge information, and stores the protocol in-charge information in HDD 115. The protocol in-charge information includes protocol identification information of SSDP included in the transmitted in-charge declaration, and the device identification information of each of MFPs 100C and 100D.

It is noted that the flow of information between main CPU 11 and sub CPU 21 included in each of MFPs 100A to 100D in the third embodiment is the same as the flow shown in FIG. 9.

FIG. 17 is a flowchart illustrating an exemplary flow of an in-charge device determining process according to the third embodiment. The in-charge device determining process is a process executed by main CPU 11 as main CPU 11 included in each of MFPs 100A to 100D executes an in-charge device determination program. It is here assumed, by way of example, that main CPU 11 included in MFP 100A executes the in-charge device determination program.

Referring to FIG. 17, main CPU 11 determines whether or not a request packet of any one of the four device searching protocols has been received (step S121). If the request packet of any one of the four device searching protocols has been received, the process proceeds to step S122; otherwise the process proceeds to step S137. In step S137, main CPU 11 determines whether or not a power-off signal has been received from any one of other MFPs 100B to 100D. If the power-off signal has been received, the process proceeds to step S138; otherwise, the process returns to step S121. In other words, the in-charge device determining process is a process executed in the case where main CPU 11 has received the request packet of any one of the four device searching protocols, or the power-off signal from any one of other MFPs 100B to 100D.

In step S122, main CPU 11 specifies a device searching protocol corresponding to the received request packet, and determines whether or not an in-charge device corresponding to the specified device searching protocol has been designated. If the protocol in-charge information including protocol identification information of the device searching protocol, or the in-charge device information is stored in HDD 115, main CPU 11 determines the in-charge device has already been designated. If the in-charge device has already been designated, the process proceeds to step S123; otherwise, the process proceeds to step S125.

In step S123, main CPU 11 determines whether or not protocol in-charge information including protocol identification information of a device searching protocol corresponding to the received request packet is stored in HDD 115. If such protocol in-charge information is stored in HDD 115, the process proceeds to step S124; otherwise, the process returns to step S121.

In step S124, main CPU 11 returns a reply packet, and the process returns to step S121. The reply packet includes at least device identification information of the device itself and the request device. Further, main CPU 11 reads from HDD 115 the protocol in-charge information including protocol identification information of the device searching protocol, and acquires, as device identification information of the request device, device identification information included in the protocol in-charge information.

In step S125, main CPU 11 returns a reply packet, and the process proceeds to step S127. The reply packet includes at least the device identification information of the device itself. In step S126, main CPU 11 determines whether or not in-charge declaration including protocol identification information of a device searching protocol corresponding to the received request packet has been received. If the in-charge declaration including protocol identification information of a device searching protocol corresponding to the received request packet has been received from among other MFPs 100B to 100D, the process proceeds to step S127; otherwise, the process proceeds to step S132.

In step S127, main CPU 11 specifies as an in-charge device a device which has transmitted the in-charge declaration. Then, main CPU 11 transmits the device identification information of the device itself to the specified in-charge device. For example, in the case where MFP 100B is specified as the in-charge device, main CPU 11 transmits by unicast to MFP 100B a packet including the device identification information of MFP 100A.

In the following step S129, main CPU 11 generates in-charge device information. The in-charge device information includes protocol identification information of a device searching protocol corresponding to the request packet received in step S121, and device identification information of the device specified as the in-charge device in step S127. In the following step S130, main CPU 11 stores the in-charge device information in HDD 115, and the process proceeds tot step S131. In step S131, main CPU 11 stops execution of a response program corresponding to a device searching protocol corresponding to the request packet received in step S121, and the process returns to step S121.

In step S132, main CPU 11 determines whether or not remaining capacity of second RAM 23 is larger than upon-execution capacity for the response program corresponding to a device searching protocol of the packet received in step S121. If the remaining capacity of second RAM 23 is larger than the upon-execution capacity for the response program, the process proceeds to step S133; otherwise, the process returns to step S126. In step S133, main CPU 11 transmits by multicast an in-charge declaration to each of other MFPs 100B to 100D, to acquire device identification information transmitted from each of other MFPs 100B to 100D (step S134). Since each of other MFPs 100B to 100D executes the in-charge device determining process, main CPU 11, in response to reception of the in-charge declaration from MFP 100A, transmits by unicast the device identification information of the device itself to MFP 100A, as described in steps S126 to S131. Thus, main CPU 11 receives the device identification information from each of other MFPs 100B to 100d.

In the following step S135, main CPU 11 generates protocol in-charge information. The protocol in-charge information includes protocol identification information of a device searching protocol corresponding to the request packet received in step S121, and device identification information of each of MFPs 100B to 100D, which was acquired in step S134. Then, main CPU 11 stores the generated protocol in-charge information in HDD 115 (step S136), and the process returns to step S121.

In step S138, main CPU 11 specifies a device which has transmitted a power-off signal, and then determines whether or not the specified device is an in-charge device (step S139). If in-charge device information including device identification information of the specified device is stored in HDD 115, main CPU 11 determines that the device which has transmitted the power-off signal is the in-charge device. If the device which has transmitted the power-off signal is the in-charge device, main CPU 11 acquires protocol identification information included in the in-charge device information, and the process proceeds to step S126. If the device which has transmitted the power-off signal is not the in-charge device, the proceeds to step S140. In step S140, main CPU 11 deletes the device identification information of the device which has transmitted the power-off signal, from among pieces of the device identification information included in the protocol in-charge information stored in HDD 115, and the process returns to step S121. This causes the device identification information of the device which has turned off to be excluded from a reply packet.

Figure 18:
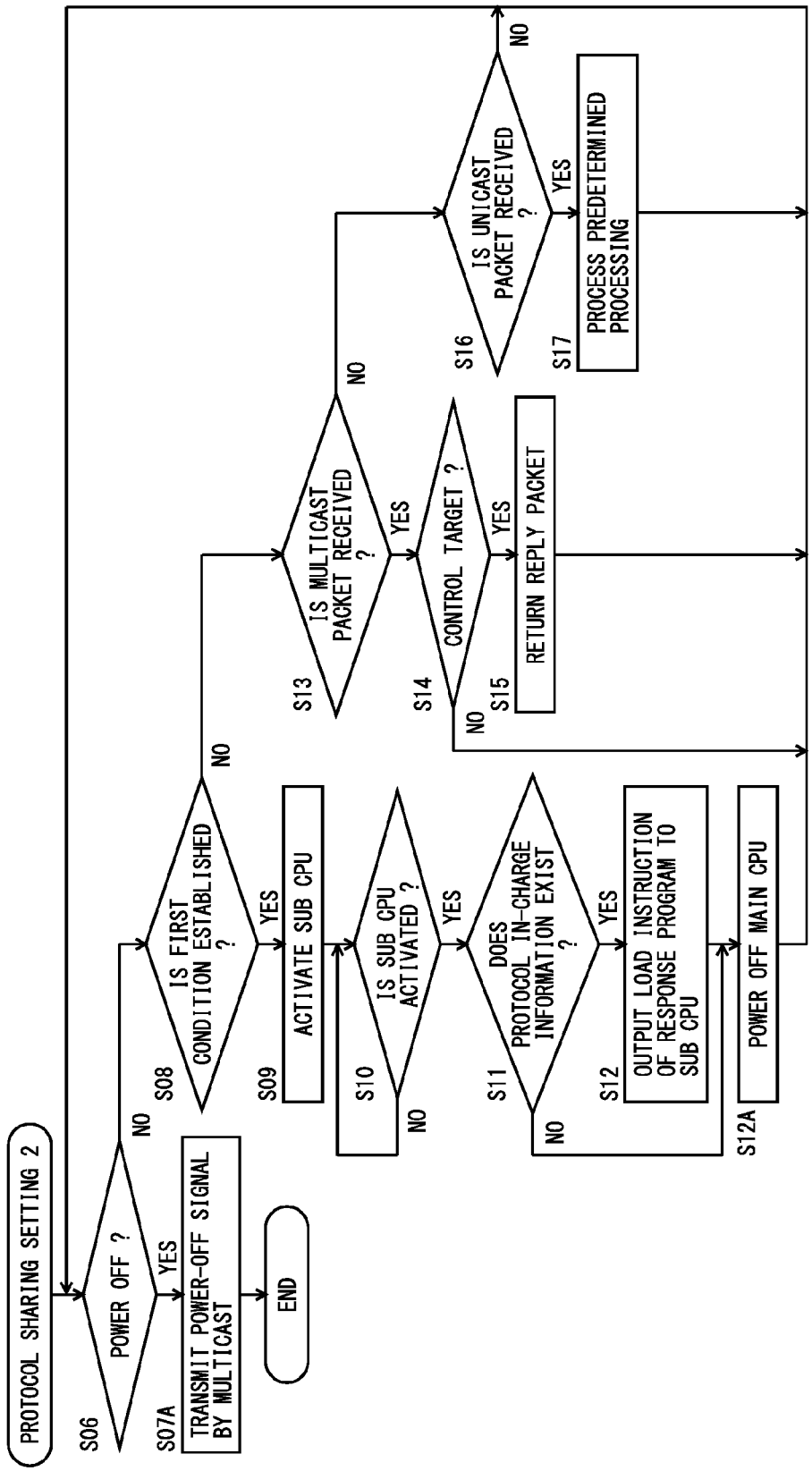
FIG. 18 is a flowchart illustrating an exemplary flow of a protocol sharing setting process according to the third embodiment.

FIG. 18 is a flowchart illustrating an exemplary flow of a protocol sharing setting process according to the third embodiment. The protocol sharing setting process according to the third embodiment is a process executed by main CPU 11 as main CPU 11 included in each of MFPs 100A to 100D executes the protocol sharing setting program. Referring to FIG. 18, the points different from the protocol sharing setting process in the first embodiment shown in FIG. 11 are as follows: steps S01 to S05 are deleted; and step S07 is changed to step S07A. Other steps in the process are the same as of FIG. 11, and thus a detailed description thereof will not be repeated. In step S07A, main CPU 11 transmits out a power-off signal in LAN 3 by multicast.

According to the third embodiment, sub CPU 21 executes the same process as the proxy reply process shown in FIG.

12, in each of MFPs 100A to 100D. It is noted, however, that in the proxy reply process according to the third embodiment, the power-off signal is not transmitted to management PC 200A, but transmitted out by multicast in LAN 3, in step S27 of FIG. 12.

As described above, in management system 1B according to the third embodiment, an image processing apparatus capable of communicating with another one or more image processing apparatuses connected to a network, includes: a main control means to stop operating upon establishment of a first condition; a sub control means to be activated by the main control means, operate during a period of time when the main control means does not operate, and refrain from operating after activating the main control means upon establishment of a second condition; and a storing means to be volatile and controlled by the sub control means, wherein the main control means includes: a packet detecting means to detect a packet, among packets externally received, of any one of a plurality of protocols predetermined; a proxy declaration means, in the case where a packet of any one of the plurality of protocols is detected by the packet detecting means, on the condition that a proxy declaration including protocol identification information for identifying a protocol of the detected packet is not received from any one of another one or more image processing apparatuses, to transmit to all of another one or more image processing apparatuses a proxy declaration including protocol identification information for identifying a protocol of the detected packet; a device acquiring means to acquire device identification information for identifying the image processing apparatus from each of another one or more image processing apparatuses; a main activating means, upon establishment of the first condition, to activate the sub control means; and a corresponding means to control to cause the sub control portion to, in the case where the proxy declaration is transmitted to another one or more image processing apparatuses, load into the storing means a response program corresponding to a protocol specified by protocol identification information included in the proxy declaration, whereas in the case where the proxy declaration is received from another one or more image processing apparatuses, refrain from loading into the storing portion a response program corresponding to a protocol specified by protocol identification information included in the proxy declaration, the sub control means includes a reply means to execute the response program loaded in the storing portion, thereby respond to a packet of a protocol corresponding to the response program, the packet being externally received by multicast, and return without activating the main control portion a reply packet including the one or more pieces of device identification information acquired by the device acquiring means.

In the case where a packet of any one of a plurality of device searching protocols is detected, among a plurality of MFPs 100A to 100D, for example, MFP 100A transmits a proxy declaration to each of other MFPs 100B to 100D on the condition that a proxy declaration has not been received from any one of other MFPs 100B to 100D. In the case where the proxy declaration has been transmitted, sub CPU 21 which is activated upon establishment of a first condition such as a sleeping shift condition, in the case of being included in the in-charge device, loads into second RAM 23 a response program corresponding to a device searching protocol of an in-charge device; whereas the proxy declaration has not been transmitted, sub CPU 21 does not load the response program. Further, sub CPU 21 executes the response program loaded into second RAM 23, thereby responds to a packet of a protocol corresponding to the response program, the packet being externally received by multicast, and returns without activating the main CPU 11 a reply packet including device identification information of other MFPs 100B to 100D. This makes it possible to determine which one of the plurality of MFPs 100A to 100D is in charge of each of the plurality of device searching protocols. Thus, this allows reducing power consumption, while allowing the plurality of MFPs 100A to 100D to handle the plurality of device searching protocols streaming in LAN 3.

Further, in the case where a packet of any one of the plurality of device searching protocols is detected, each of a plurality of MFPs 100A to 100D, for example, MFP 100A, transmits a proxy declaration on the condition that sub CPU 21 is able to execute a response program corresponding to a device searching protocol of the packet. Therefore, the proxy declaration is transmitted only in the case where the response program is executable after establishment of a first condition such as a sleeping shift condition, and thus, the response program may be executed without fail.

Furthermore, main CPU 11 determines the response program is executable in the case where free capacity after the response program has been loaded into second RAM 23 by sub CPU 21 is equal to or greater than a predetermined value. This makes it possible to readily determine whether or not the response program is executable.

Furthermore, each of a plurality of MFPs 100A to 100D, for example, MFP 100A, in the case of being the in-charge device, transmits a stop signal to each of other MFPs 100B to 100D. When the stop signal is received from any one of other MFPs 100B to 100D, in the case where the proxy declaration has been received from the device, for example, MFP 100B which has transmitted the stop signal, main CPU 11 transmits the proxy declaration including protocol identification information included in the proxy declaration received from MFP 100B, to each of MFPs 100C and 100D, on the condition that the proxy declaration has not been received from each of MFPs 100C and 100D. This allows one or more MFPs among other MFPs, which does not refrain from operating, to handle the plurality of protocols.

In the foregoing third embodiment, management system 1B has been described by way of example. However, it is needless to say that the present invention can be understood as a protocol sharing method for causing each of MFPs 100A to 100D to execute the in-charge device determining process shown in FIG. 17 and the proxy reply process shown in FIG. 18, as well as a protocol sharing program for causing main CPU 11 and sub CPU 21 included in each of MFPs 100A to 100D to execute the protocol sharing method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. A management system comprising:
a plurality of image processing apparatuses connected to a network; and a management device to manage said plurality of image processing apparatuses, wherein
a controller included in said management device executes instructions stored in a memory to implement functions of:
an acquiring portion configured to acquire, from each of said plurality of image processing apparatuses, ability information indicating an ability of the image processing apparatus and device identification information for identifying the image processing apparatus;

an in-charge device determining portion configured to determine, on the basis of the ability information of each of said plurality of image processing apparatuses, as an in-charge device any one of said plurality of image processing apparatuses for each of a plurality of protocols predetermined; and a sharing information notifying portion configured to, for each of said plurality of protocols, cause said in-charge device determined for the protocol to respond to a packet by multicast of the protocol on behalf of said plurality of image processing apparatuses, and cause one or more image processing apparatuses, other than said in-charge device determined for the protocol, to refrain from responding to a packet by multicast of the protocol, each of said plurality of image processing apparatuses responds to a packet by multicast of the protocol in the case where the image processing apparatus is determined as the in-charge device for the protocol.

2. The management system according to claim 1, wherein said sharing information notifying portion, for each of said plurality of protocols, causes said in-charge device determined for the protocol to store protocol in-charge information including protocol identification information for identifying the protocol and device identification information of each of one or more image processing apparatuses other than said in-charge device among said plurality of image processing apparatuses, and causes one or more image processing apparatuses other than said in-charge device determined for the protocol to store protocol request information including protocol identification information of the protocol, and a controller included in each of said plurality of image processing apparatuses includes:
a main CPU to refrain from operating upon establishment of a first condition;
a sub CPU to be activated by said main CPU, and after being activated, refrain from operating after activating said main CPU upon establishment of a second condition; and
a storage to be volatile and controlled by said sub CPU, wherein
said main CPU executes instructions stored in a memory to implement functions of:
a sharing information acquiring portion configured to acquire from said management device said protocol in-charge information or said protocol request information for each of said plurality of protocols;
a main activating portion configured to, upon establishment of said first condition, activate said sub CPU; and
a load control portion configured to control to cause said sub CPU to, in the case where said protocol in-charge information is acquired, load into said storage a response program corresponding to a protocol specified by protocol identification information included in the protocol in-charge information, whereas in the case where said protocol request information is acquired, refrain from loading into said storage a response program corresponding to a protocol specified by protocol identification information included in the protocol request information, said sub CPU includes a reply portion configured to execute a response program loaded in said storage, thereby respond to a packet of a protocol corresponding to said response program, the packet being externally received by multicast, and return without activating said main CPU a reply packet including device identification information of one or more request devices included in said protocol in-charge information being acquired by said main CPU and including protocol identification information of a protocol corresponding to said response program.

3. The management system according to claim 2, wherein each of said plurality of image processing apparatuses is able to shift between a normal mode and a power-saving mode in which power consumption is smaller than in the normal mode,
said main CPU is activated in said normal mode, and
said sub CPU is activated in said power-saving mode.

4. The management system according to claim 1, further comprising a management computer different from said plurality of image processing apparatuses, wherein said management device is said management computer.

5. The management system according to claim 4, wherein said in-charge device determining portion executes instructions stored in a memory to implement functions of
a candidate device accepting portion configured to accept from a user, designation of a candidate device, among said plurality of image processing apparatuses, corresponding to each of said plurality of protocols, and
a remaining ability display portion configured to, for each of said candidate devices, on the basis of ability information of the candidate device, display remaining ability information indicating an ability to execute said response program corresponding to a protocol corresponding to said candidate device.

6. The management system according to claim 2, further comprising a management computer different from said plurality of image processing apparatuses, wherein:
said management device is said management computer;
said in-charge device determining portion includes
accepting from a user, designation of a candidate device, among said plurality of image processing apparatuses, corresponding to each of said plurality of protocols, and
for each of said candidate devices, on the basis of ability information of the candidate device, displaying remaining ability information indicating an ability to execute said response program corresponding to a protocol corresponding to said candidate device;
ability information of each of said plurality of image processing apparatuses indicates free capacity of said storage included in the image processing apparatus; and
remaining ability information of said candidate device indicates free capacity remaining after that said sub CPU included in the candidate device has loaded said response program into said storage.

7. The management system according to claim 1, wherein said management device is an image processing apparatus predetermined among said plurality of image processing apparatuses.

8. The management system according to claim 7, wherein said in-charge device determining portion includes an ability priority determining portion configured to, on the basis of ability information of each of said plurality of image processing apparatuses, determine an in-charge device in order from among devices having spare ability.

9. The management system according to claim 8, wherein ability information of each of said plurality of image processing apparatuses indicates free capacity of said storage included in the image processing apparatus.

10. The management system according to claim 2, wherein said main CPU includes a main reply portion configured to,
in the case where said protocol in-charge information is acquired, execute a response program corresponding to a protocol specified by protocol identification information included in the protocol in-charge information, thereby respond to a packet of a protocol corresponding to said response program, the packet being externally received by multicast, and return a reply packet including device identification information of said one or more request devices included in said protocol in-charge information being acquired by said main CPU and including protocol identification information of the protocol,
whereas in the case where said protocol request information is acquired, refrain from executing a response program corresponding to a protocol specified by protocol identification information included in the protocol request information.

11. The management system according to claim 1, wherein said controller included in said management device executes instructions stored in the memory to implement functions of an in-charge device redetermining portion configured to,
in the case where it is notified that said in-charge device stops, on the basis of ability information of one or more remaining image processing apparatuses other than said in-charge device among said plurality of image processing apparatuses, determine as a new in-charge device any one of said one or more remaining image processing apparatuses, for each of a plurality of protocols.

12. The management system according to claim 2, wherein said load control portion rewrites a boot program that said sub CPU reads upon activation, and thereby causes said sub CPU to load said response program into said storage.

13. An image processing apparatus capable of communicate with another one or more image processing apparatuses connected to a network, comprising a control portion, wherein said control portion executes instructions stored in a memory to implement functions of:
an acquiring portion configured to, from each of said another one or more image processing apparatuses, acquire ability information indicating an ability of the image processing apparatus and device identification information for identifying the image processing apparatus;
an in-charge device determining portion configured to determine, on the basis of the ability information of each of a plurality of image processing apparatuses including the apparatus itself and said another one or more image processing apparatuses, as an in-charge device any one of said one or more image processing apparatuses for each of a plurality of protocols predetermined; and
a sharing information notifying portion configured to, for each of said plurality of protocols, cause said in-charge device determined for the protocol to respond to a packet by multicast of the protocol on behalf of said plurality of image processing apparatuses, and cause one or more image processing apparatuses other than said in-charge device determined for the protocol to refrain from responding to a packet by multicast of the protocol.

14. The image processing apparatus according to claim 13, wherein said sharing information notifying portion, for each of said plurality of protocols,
causes said in-charge device determined for the protocol to store protocol in-charge information including protocol identification information for identifying the protocol and device identification information of each of one or more image processing apparatuses other than said in-charge device among said another one or more image processing apparatuses,
and causes one or more image processing apparatuses other than said in-charge device determined for the protocol to store protocol request information including protocol identification information of the protocol.

15. The image processing apparatus according to claim 14, wherein said control portion includes:
a main CPU to refrain from operating upon establishment of a first condition;
a sub CPU to be activated by said main CPU, and after being activated, refrain from operating after activating said main CPU upon establishment of a second condition; and
a storage to be volatile and controlled by said sub CPU, wherein
in the case where said protocol in-charge information is stored and the image processing apparatus functions as a management device, said sub CPU loads into said storage a response program corresponding to a protocol specified by protocol identification information included in the protocol in-charge information, executes the response program loaded in said storage, thereby responds to a packet of a protocol corresponding to said response program, the packet being externally received by multicast, and returns without activating said main CPU a reply packet including device identification information of said one or more request devices included in said protocol in-charge information.

16. A non-transitory computer-readable recording medium encoded with a protocol sharing program executed by a controller controlling an image processing apparatus capable of communicating with another one or more image processing apparatuses connected to a network, the protocol sharing program causes said controller to execute:
an acquiring step of acquiring, from each of said another one or more image processing apparatuses, ability information indicating an ability of the image processing apparatus and device identification information for identifying the image processing apparatus;
an in-charge device determining step of determining, on the basis of the ability information of each of said another one or more image processing apparatuses, as an in-charge device any one of said one or more image processing apparatuses for each of a plurality of protocols predetermined; and
a sharing information notifying step of, for each of said plurality of protocols, causing said in-charge device determined for the protocol to respond to a packet by multicast of the protocol on behalf of said plurality of image processing apparatuses, and causing one or more image processing apparatuses other than said in-charge device determined for the protocol to refrain from responding to a packet by multicast of the protocol.

17. The non-transitory computer-readable recording medium encoded with a protocol sharing program according to claim 16, wherein said sharing information notifying step includes a step of, for each of said plurality of protocols:

causing said in-charge device determined for the protocol to store protocol in-charge information including protocol identification information for identifying the protocol and device identification information of each of one or more image processing apparatuses other than said in-charge device among said another one or more image processing apparatuses, and causing one or more image processing apparatuses other than said in-charge device determined for the protocol to store protocol request information including protocol identification information of the protocol.

18. The non-transitory computer-readable recording medium encoded with a protocol sharing program according to claim 17, wherein said controller includes:

a main CPU to refrain from operating upon establishment of a first condition;

a sub CPU to be activated by said main CPU, and after being activated, refrain from operating after activating said main CPU upon establishment of a second condition; and a storage to be volatile and controlled by said sub CPU, the protocol sharing program causes said sub CPU to execute:

a step of, in the case where said protocol in-charge information is stored and the image processing apparatus functions as a management device, loading into said storage a response program corresponding to a protocol specified by protocol identification information included in the protocol in-charge information; and a step of executing the response program loaded in said storage, thereby responding to a packet of a protocol corresponding to said response program, the packet being externally received by multicast, and returning without activating said main CPU a reply packet including device identification information of said one or more request devices included in said protocol in-charge information.

19. A non-transitory computer-readable recording medium encoded with a protocol sharing program executed by a computer controlling a management device managing a plurality of image processing apparatuses connected to a network, the protocol sharing program causes said computer to execute:

an acquiring step of acquiring, from each of said plurality of image processing apparatuses, ability information indicating an ability of the image processing apparatus and device identification information for identifying the image processing apparatus;

an in-charge device determining step of determining, on the basis of the ability information of each of said plurality of image processing apparatuses, as an in-charge device any one of said plurality of image processing apparatuses for each of a plurality of protocols predetermined; and a sharing information notifying step of controlling said plurality of image processing apparatuses to, for each of said plurality of protocols, cause said in-charge device determined for the protocol to respond to a packet by multicast of the protocol on behalf of said plurality of image processing apparatuses, and cause one or more image processing apparatuses other than said in-charge device determined for the protocol to refrain from responding to a packet by multicast of the protocol.

* * * * *